US006299362B1

(12) United States Patent
Gilliland et al.

(10) Patent No.: US 6,299,362 B1
(45) Date of Patent: Oct. 9, 2001

(54) HIGH SPEED OPTICAL INTERFACE CONVERTER MODULE HAVING MOUNTING HALVES

(75) Inventors: Patrick B. Gilliland, Chicago; Leonid G. Shatskin, Wheaton; Raul Medina, Chicago, all of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/334,200

(22) Filed: Jun. 16, 1999

Related U.S. Application Data

(63) Continuation-in-part of application No. 09/160,816, filed on Sep. 25, 1998, now Pat. No. 6,179,627, which is a continuation-in-part of application No. 09/064,208, filed on Apr. 22, 1998, now Pat. No. 6,203,333.

(51) Int. Cl.[7] .................................................. G02B 6/36
(52) U.S. Cl. .................................................. 385/92
(58) Field of Search .................................................. 385/88, 92

(56) References Cited

U.S. PATENT DOCUMENTS

| | | | |
|---|---|---|---|
| 4,245,887 | 1/1981 | Johnson . | |
| 4,253,730 | 3/1981 | Logan et al. . | |
| 4,445,750 | 5/1984 | Grois et al. . | |
| 4,449,784 | 5/1984 | Basov et al. . | |
| 5,069,522 * | 12/1991 | Block et al. | 385/39 |
| 5,157,749 | 10/1992 | Briggs et al. | 385/60 |
| 5,546,281 * | 8/1996 | Poplawski et al. | 361/752 |
| 5,596,663 | 1/1997 | Ishibashi et al. | 385/92 |
| 5,631,990 * | 5/1997 | Hashizume | 385/92 |

FOREIGN PATENT DOCUMENTS

| | | | |
|---|---|---|---|
| 57-185009 * | 11/1982 | (JP) | 385/92 |

* cited by examiner

*Primary Examiner*—Neil Abrams
(74) *Attorney, Agent, or Firm*—Karl D. Kovach

(57) ABSTRACT

A device which retains a polymer mounting block between a metallic cover and a metallic base. The mounting block includes two mounting halves. The mounting halves being hermaphroditic such that a pair of the mounting halves of the mounting block being substantially identical can be assembled in opposite transverse relation to form the mounting block. The mounting half of the mounting block includes a member and two latch arms attached to the member. The member includes a transmitter mounting provision and a receiver mounting provision. The transmitter mounting provision receives a transmitter sub-assembly, and the receiver mounting provision receives a receiver sub-assembly. The transmitter mounting provision and the receiver mounting provision straddle the second latch arm, and the first latch arm and the second latch arm straddle one of the transmitter mounting provision and the receiver mounting provision.

6 Claims, 15 Drawing Sheets

158

HIGH SPEED OPTICAL INTERFACE CONVERTER MODULE HAVING MOUNTING HALVES

This application is a continuation-in-part of U.S. Ser. No. 09/160,816, filed on Sep. 25, 1998, now U.S. Pat. No. 6,179,627, which is a continuation-in-part of U.S. Ser. No. 09/064,208, filed on Apr. 22, 1998, now U.S. Pat. No. 6,203,333, and this case is related to U.S. Ser. No. 08/863,767, filed on May 27, 1997, now U.S. Pat. No. 5,966,487, all of which are hereby incorporated herein by reference.

BACKGROUND OF THE INVENTION

The present invention relates to an improved pluggable electronic module configured to connect and/or convert data signals from a first serial transmission medium to a second serial transmission medium. A preferred embodiment of the invention relates particularly to an improved Giga-bit Interface Converter (GBIC) as defined by the GBIC specification, the teaching of which is incorporated herein by reference. However, the improvements disclosed in this specification are applicable to high-speed data communication modules other than GBICs as well.

The GBIC specification was developed by a group of electronics manufactures in order to arrive at a standard small form factor transceiver module for use with a wide variety of serial transmission media and connectors. The specification defines the electronic, electrical, and physical interface of a removable serial transceiver module designed to operate at Giga-bit speeds. A GBIC provides a small form factor pluggable module which may be inserted and removed from a host or switch chassis without powering off the receiving socket. The GBIC standard allows a single standard interface to be changed from a first serial medium to an alternate serial medium by simply removing a first GBIC module and plugging in a second GBIC having the desired alternate media interface.

The GBIC form factor defines a module housing which includes a first electrical connector for connecting the module to a host device or chassis. This first electrical connector mates with a standard socket which provides the interface between the host device printed circuit board and the module. Every GBIC has an identical first connector such that any GBIC will be accepted by any mating GBIC socket. The opposite end of the GBIC module includes a media connector which can be configured to support any high performance serial technology. These high performance technologies include: 100 Mbyte multi-mode short wave laser without OFC; 100 Mbyte single-mode long-wave laser with 10 km range; Style 1 intracabinet differential ECL; and Style 2 intracabinet differential ECL.

The GBIC module itself is designed to slide into a mounting slot formed within the chassis of a host device. The mounting slot may include guide rails extending back from the opening in the chassis wall. At the rear of the slot the first electrical connector engages the mating socket which is mounted to a printed circuit board within the host device. The GBIC specification requires two guide tabs to be integrated with the electrical connector. As the connector is mated with the socket, the guide tabs of the connector engage similar structures integrally formed with the socket. The guide tabs are to be connected to circuit ground on both the host and the GBIC. The guide tabs engage before any of the contact pins within the connector and provide for static discharge prior to supplying voltage to the module. When the GBIC is fully inserted in this manner, and the connector fully mated with the socket only the media connector extends beyond the host device chassis.

Copper GBIC's allow the host devices to communicate over a typical copper serial transmission medium. Typically this will comprise a shielded cable comprising two or four twisted pairs of conductors. In such cables, the media connector will generally be a standard DB-9 electrical connector, or an HSSDC (High Speed Serial Data Connector) at each end. In the case of copper GBICs this DB-9 or HSSDC connector is a purely passive device and serves no other function than to connect electrical signals between the cable and the GBIC module. Thus, it may be desirable to eliminate the connector altogether, and directly attach two copper GBICs, one at each end of the copper cable, thereby eliminating two connectors and reducing the cost of the data link. It may be further desired to make such direct attach copper GBICs field installable such that the transmission cable may be routed and installed prior to attaching the GBIC modules. Such field installable GBICs would help reduce the risk of damage to the modules while the wiring is being installed.

In designing GBIC modules, a factor which must be considered is that GBICs are high frequency devices designed to operate at speeds above 1 Giga-bit per second. Thus, the modules carry the potential of emitting high frequency signals to the surrounding area, which may adversely affect sensitive equipment situated nearby. Therefore, a sophisticated shielding mechanism is required in order to prevent such unwanted emissions. In prior art modules, this has generally included a metallized or metal clad portion of the module located adjacent the media connector. The metal portion is configured to engage the chassis wall of the host device when the module is fully inserted into the mounting slot. The metallized portion of the module and the chassis wall form a continuous metal barrier surrounding the slot opening. The metal barrier blocks any high frequency emissions from escaping from the host chassis due to a gap between the module and the chassis-mounting slot. A disadvantage of prior art GBIC modules, however, is that spurious emissions are free to escape the module directly through the media connector. This leakage has the potential of disrupting the operation of nearby devices. The problem is most acute in so called "copper GBICs" where an electrical connector is provided as the media connector. Furthermore, most prior art GBIC modules are formed of a plastic outer housing which allows EMI signals generated by the GBIC to propagate, freely within the chassis of the host device. These emissions can interfere with other components mounted within the host chassis and can further add to the leakage problem at the media end of the module.

Therefore, what is needed is an improved high speed pluggable communication module having an improved media connector end which acts to block all spurious emissions from escaping beyond the module housing. Such an improved module should be adaptable to function as a Giga-Bit Interface Converter module and interface with any GBIC receptacle socket. In such a module, the host connector should conform to the GBIC specification and include the requisite guide tabs connected to the circuit ground. At the media end of the module, the improved module may include either an DB-9 style 1 copper connector, an HSSDC style 2 copper connector, or an SC duplex fiber optic connector as the second end media connector. Alternately, the module may provide for the direct attachment of the module to a copper transmission medium such that a single shielded copper cable may be interconnected between two host devices with an individual GBIC connected at each end. It is further desired that the module include latching tabs to affirmatively lock the module into a corresponding host socket. Internally, the module should contain whatever electronics are necessary to properly convert the data signals from the copper transmission medium of the host device to whichever medium is to be connected to the media end of the module. In the case of GBIC modules, all of the operating parameters as well as mechanical and electrical requirements of the GBIC specification should be met by the improved module. However, though it is most desired to provide an improved GBIC module, it must be noted that the novel aspects of a transceiver module solving the problems outlined above may be practiced with high-speed serial modules other than GBICs.

SUMMARY OF THE INVENTION

In light of the prior art as described above, one of the main objectives of the present invention is to provide an improved small form factor interface module for exchanging data signals between a first transmission medium and a second transmission medium.

A further object of the present invention is to provide an improved small form factor interface module configured to operate at speeds in excess of 1 Giga-Bit per second.

Another objective of the present invention is to provide an improved interface module to prevent spurious electromagnetic emissions from leaking from the module.

Another objective of the present invention is to provide an improved interface module having a die cast metal outer housing including a ribbon style connector housing integrally formed therewith.

Another objective of the present invention is to provide an improved interface module having a die cast metal outer housing including detachable insulated latch members for releasably engaging a host device socket.

Another objective of the present invention is to provide and improved interface module having a die cast metal outer housing with an integrally cast electrical connector, including guide tabs electrically connected to the circuit ground of the module and configured to engage similar ground structures within a host device socket.

Still another objective of the present invention is to provide an improved Giga-Bit Interface Converter (GBIC) having a media connector mounted remote from the GBIC housing.

An additional objective of the present invention is to provide an improved GBIC having a shielded cable extending from the module housing, with the cable shield being bonded to the housing in a manner which electromagnetically seals the end of the module housing.

A further objective of the present invention is to provide an improved GBIC having a remote mounted media connector comprising a DB-9 connector.

A still further objective of the present invention is to provide an improved GBIC having a remote mounted media connector comprising an HSSDC connector.

Another objective of the present invention is to provide an improved GBIC having a remote mounted media connector comprising a 1×9 transceiver module.

Another objective of the present invention is to provide an improved GBIC module having a flexible shielded cable extending therefrom, and a second GBIC module being connected at the remote end of the cable wherein the two GBIC modules are field installable.

A further objective of the present invention is to provide an improved GBIC having a media connector incorporated with the GBIC housing and integrally formed therewith in order to provide an inexpensive, easily assembled module.

It is another object of the present invention to provide an improved GBIC module having an HSSDC connector integrally formed with the module components.

It is still an additional object of the present invention to provide an improved GBIC module having a DB-9 connector incorporated as the media connector mounted within the module.

It is a further object of the present invention to provide an interface module having a SC duplex optical receptacle incorporated as the media connector formed with the module housing.

It is another object of the invention to provide a way for holding the transceiver device in the housing.

All of these objectives, as well as others that will become apparent upon reading the detailed description of the presently preferred embodiment of the invention, are met by the Latch Block Insert for a Improved High Speed Interface Converter Module herein disclosed.

The present invention provides a small form factor, high speed serial interface module, such as, for example, a Giga-Bit Interface Converter (GBIC). The module is configured to slide into a corresponding slot within the host device chassis where, at the rear of the mounting slot, a first connector engages the host socket. A latching mechanism may be provided to secure the module housing to the host chassis when properly inserted therein. It is desirable to have a large degree of interchangeability in such modules, therefore across any product grouping of such modules, it is preferred that the first connector be identical between all modules within the product group, thus allowing any particular module of the group to be inserted into any corresponding host socket. It is also preferred that the first connector include sequential mating contacts such that when the module is inserted into a corresponding host socket, certain signals are connected in a pre-defined sequence. By properly sequencing the power and grounding connections the module may be "Hot Pluggable" in that the module may be inserted into and removed from a host socket without removing power to the host device. Once connected, the first connector allows data signals to be transferred from the host device to the interface module.

The preferred embodiment of the invention is to implement a remote mounted media connector on a standard GBIC module according the GBIC specification. However, it should be clear that the novel aspects of the present invention may be applied to interface modules having different form factors, and the scope of the present invention should not be limited to GBIC modules only.

In a preferred embodiment, the module is formed of a two piece die cast metal housing including a base member and a cover. In this embodiment the host connector, typically a D-Shell ribbon style connector, is integrally cast with the base member. The cover is also cast metal, such that when the module is assembled, the host end of the module is entirely enclosed in metal by the metal base member, cover, and D-Shell connector, thereby effectively blocking all spurious emissions from the host end of the module.

A printed circuit board is mounted within the module housing. The various contact elements of the first electrical connector are connected to conductive traces on the printed circuit board, and thus serial data signals may be transferred between the host device and the module. The printed circuit board includes electronic components necessary to transfer data signals between the copper transmission medium of the host device to the transmission medium connected to the output side of the module. These electronic components may include passive components such as capacitors and resistors for those situations when the module is merely passing the signals from the host device to the output medium without materially changing the signals, or they may include more active components for those cases where the data signals must be materially altered before being broadcast on the output medium.

In a further preferred embodiment, a portion of the printed circuit board extends through the cast metal D-Shell connector. The portion of the printed circuit board extending into the D-Shell includes a plurality of contact fingers adhered thereto, thereby forming a contact support beam within the metal D-Shell. Additional guide tabs extend from the printed circuit board on each side of the contact beam. The guide tabs protrude through apertures on either side of the D-Shell. A metal coating is formed on the outer edges of the guide tabs and connected to the ground plane of the printed circuit board. The guide tabs and the metal coating formed thereon are configured to engage mating structures formed within the host receiving socket, and when the module is inserted into the host receiving socket, the guide tabs act to safely discharge any static charge which may have built up on the module. The module housing may also include a metal U-shaped channel extending from the front face of the D-Shell connector adjacent the apertures formed therein, the channel forming a rigid support for the relatively fragile guide tabs.

Again, in an embodiment, an interface converter module includes a die cast metal base member and cover. Both the base member and the cover include mutually opposing cable supports. Each cable support defines a semicircular groove having a plurality of inwardly directed teeth formed around the circumference thereof. The opposing cable supports of the cover align with the corresponding cable supports of the base member. Each pair of opposing cable supports thereby form a circular opening through which a flexible shielded cable may pass, and the inwardly directed teeth formed within each groove engage the cable and secure the cable within the module. Furthermore, the outer layer of insulation of the cable may be stripped away such that a portion of the metallic shield is exposed. When stripped in this manner, the cable may be placed within the module with the outer layer of cable insulation adjacent a first and second pair of cable supports and the exposed shield portion of the cable adjacent a third and fourth pair of cable supports. The teeth of the first and second pair of cable supports compress the outer layer of insulation and secure the cable within the module. Similarly, the teeth of the third and fourth cable supports engage the exposed metal shield, thereby forming a secure electrical connection between the cast metal module housing and the cable shield. In order to ensure a secure connection with the cable shield, the radii of the semicircular grooves and the third and fourth cable supports are reduced to match the corresponding reduction in the diameter of the cable where the insulation has been stripped away. Further, the insulation of the individual conductors may be stripped such that the bare conductors may be soldered to individual solder pads formed along the rear edge of the module's printed circuit board.

In a similar embodiment, the module is made field installable. Rather than being soldered to the printed circuit board, the individual conductors may be connected utilizing an insulation displacement connector (IDC) mounted to the printed circuit board. In this embodiment the housing cover includes an IDC cover mounted on an inner surface of the cover. When the module is assembled, the IDC cover forces the individual conductors of the flexible cable onto knife contacts within the IDC connector. The knife contacts cut through the conductor's insulation to form a solid electrical connection with the copper wire within.

A media connector is attached at the remote end of the flexible shielded cable. The media connector may be configured as any connector compatible with the high performance serial transmission medium to which the module is to provide an interface. In the preferred embodiments of the invention, these connectors include a standard DB-9 connector or an HSSDC connector for applications where the module is interfacing with a copper transmission medium, or may include an optoelectronic transceiver such as a 1×9 for those cases where the interface module is to interface with a fiber optic medium. Within the housing the various conductors comprising the flexible shielded cable are connected to the printed circuit board and carry the serial data signals between the remote media connector and the module. In an alternate configuration, the length of the flexible cable is extended and a second interface module substantially identical to the first module is connected to the remote end of the cable.

In another embodiment, the module includes a plastic housing having a metallized or metal encased end portion. The housing includes a first end containing a discrete host connector. The conductive portion of the housing is configured to engage the perimeter of the mounting slot in the metal chassis of the host device which receives the module. This metal to metal contact forms a continuous metal barrier against the leakage of spurious emissions. The conductive portion of the housing includes the end wall of the module housing opposite the end containing the connector. This end wall at the second end of the housing includes a small circular aperture through which a short section of a flexible shielded cable protrudes. The flexible cable includes a plurality of individual conductors, which may be connected to electrical circuits formed on the printed circuit board, and the cable shield bonded to the conductive portion of the housing. In a first preferred embodiment the cable comprises a four conductor shielded cable, and in an alternative embodiment an eight conductor shielded cable is provided.

Thus is provided an adapter module for transmitting serial data signals between a first transmission medium and a second transmission medium. The module is defined by an electromagnetically sealed housing having first and second ends. The housing may be formed of die cast metal. The first end of the housing has a first connector attached thereto, which may be integrally cast with a base member of the housing. A flexible cable extends from the second end of the housing. The flexible cable includes a metallic shield which is bonded to the housing in a manner to electromagnetically seal the second end of the housing, thereby preventing high frequency electromagnetic emissions from escaping the housing. Individual conductors within the cable are connected to circuits mounted on a printed circuit board contained within the housing. Finally, a media connector is mounted at the remote end of the flexible cable for connecting to an external serial transmission medium.

There is also provided an interface converter module including a die-cast metal base member and die-cast metal cover. At a first end a D-shell ribbon style connector is formed having an integrally cast shroud with the base member. A printed circuit board is mounted within the cover including portions of the printed circuit board that extend through the cast metal D-shell connector. The portion of the printed circuit board extending into the D-shell includes a plurality of contact fingers adhered thereto and thereby forming a contact support beam within the metal D-shell. Additional guide tabs extend from the printed circuit board on each side of the contact beam. The guide tabs protrude through apertures on either side of the D-shell. A metal coating is formed on the outer edges of the guide tabs and connects to the ground plane of the printed circuit board. The guide tabs and the metal coating formed thereon are configured to engage mating structures formed within a host receiving socket and when the module is inserted into the host receiving socket the guide tabs act to safely discharge any static charge which may have built up on the module. The module housing may also include a metal U-shaped channel extending from the front face of the D-shell connector adjacent the apertures formed thereon, the channel forming a rigid support for the fragile guide tabs.

At the second end of the interface converter module is an integrally formed media connector. The cover and the base member are formed at the second end to form an aperture specifically designed to receive a designated plug style. In an embodiment the cover and base are formed specifically to provide a receptacle opening to receive an HSSDC plug. The media receptacle includes ramped portions to receive the latching member of an HSSDC plug. In an embodiment, mounted within the receptacle opening is a printed circuit board having a protruding portion having a plurality of contact fingers adhered thereto forming a contact support beam within the HSSDC receptacle to connect to the metallic fingers of the HSSDC plug. In an embodiment, the printed circuit board that provides for the contact fingers of the HSSDC connector receptacle at the second end of the module is integrally formed as one piece with the printed circuit board that forms the contact fingers at the first end of the module for the D-shaped pluggable male ribbon style connector.

In a further embodiment the module housing includes a DB-9 connector mounted at the second end. In a still further embodiment the module housing includes a SC duplex optical receptacle formed with the base and cover of the module.

In yet another embodiment a mounting half is provided which holds the transceiver device in the module housing. The mounting half is hermaphroditic so that it can mount to itself.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6*a*—A DB-9 connector;

FIG. 6*b*—An HSSDC connector;

FIG. 6*c*—A second interface converter module;

FIG. 6*d*—An SC duplex fiber optic connector;

DETAILED DESCRIPTION OF THE PRESENTLY PREFERRED EMBODIMENTS

Figure 1:
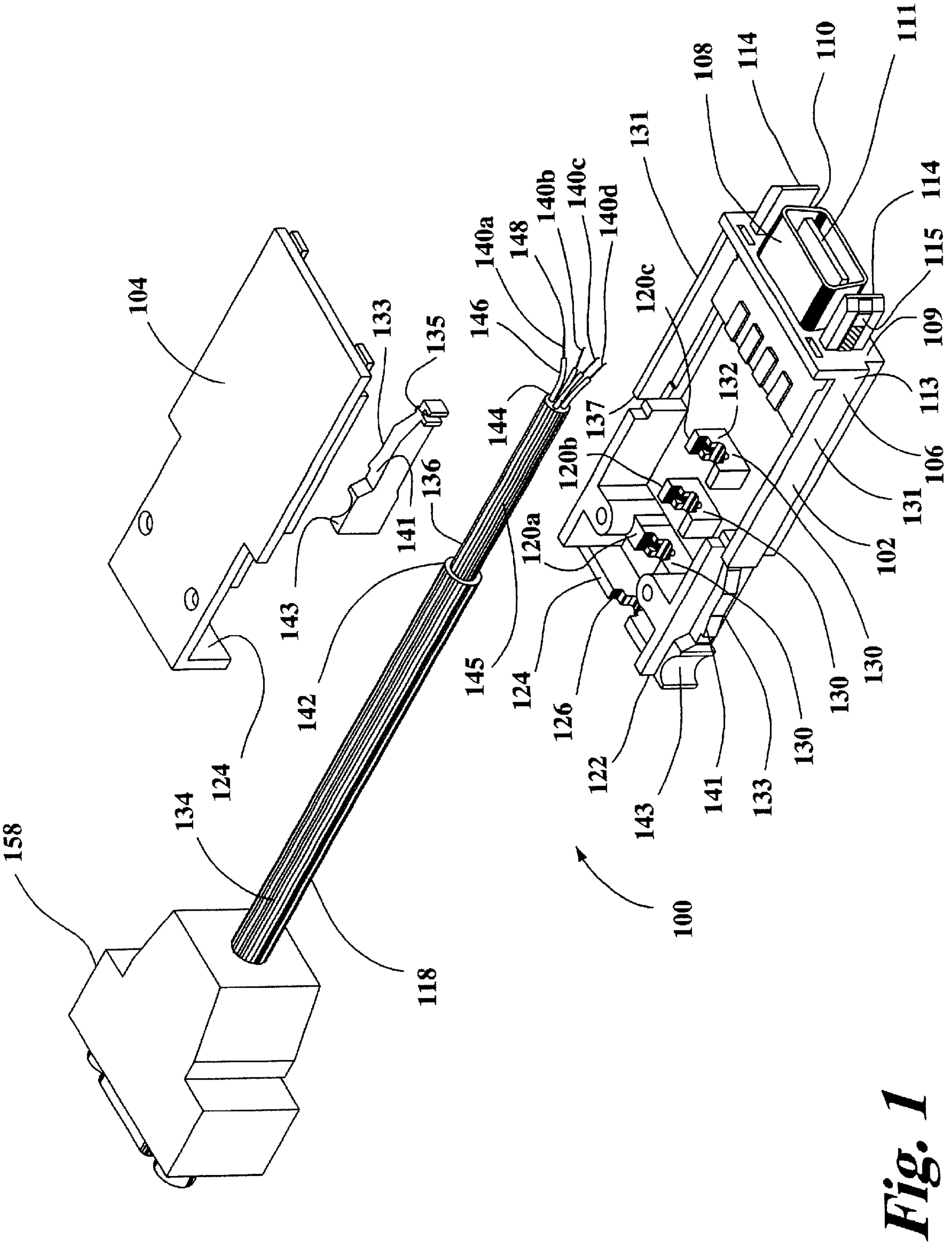
FIG. 1 is an exploded isometric view of an interface module according to the preferred embodiment of the invention.
Figure 2:
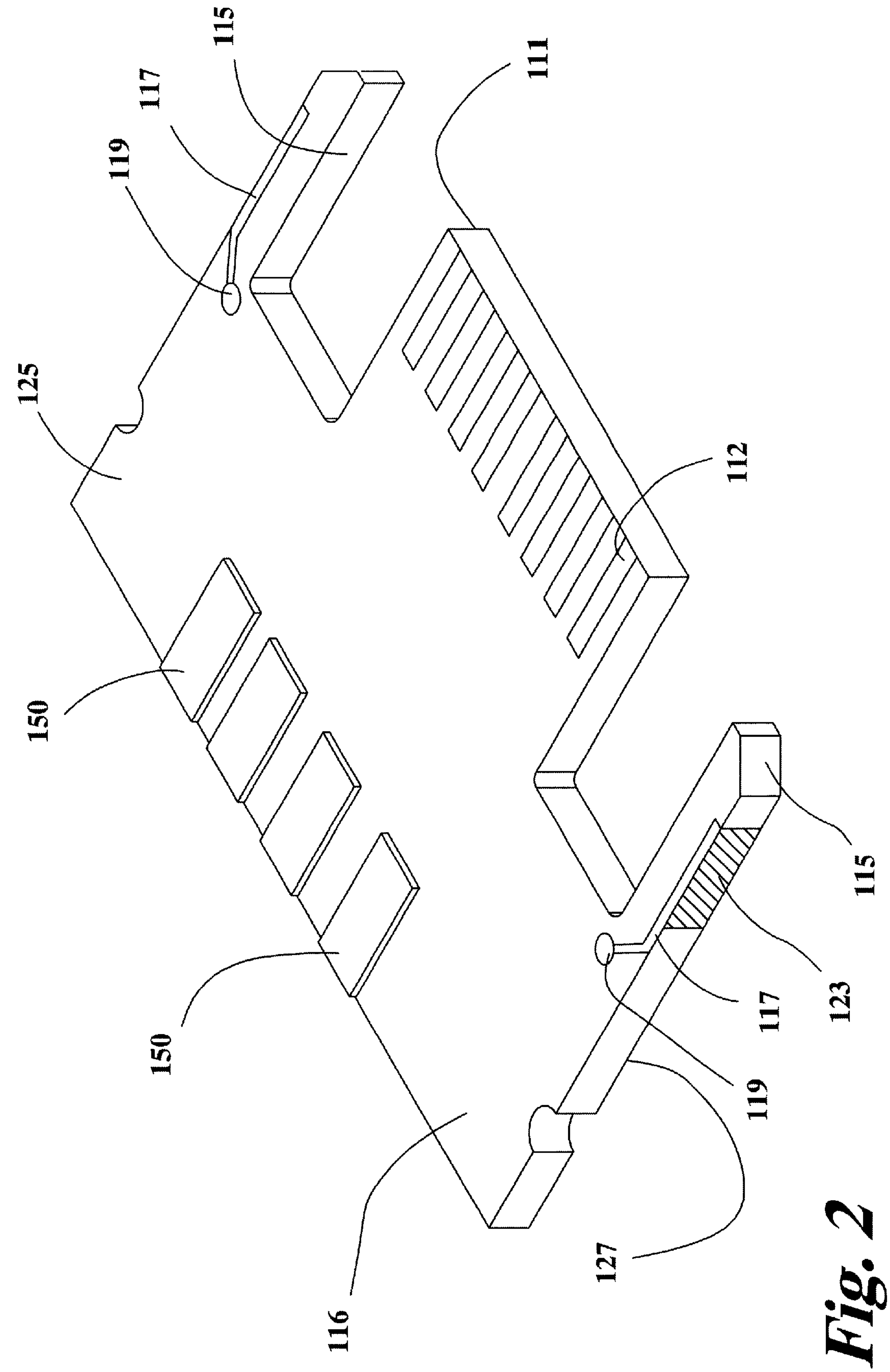
FIG. 2 is an isometric view of a printed circuit board to be mounted within the module housing shown in FIG. 1.

Referring to FIGS. 1, 2, 3 and 5, an interface module is shown according to a first embodiment of the invention 100. In this preferred embodiment, module 100 conforms to the GBIC specification, although the novel aspects of the invention may be practiced on other interface modules having alternate form factors. Module 100 includes a two piece die cast metal housing including a base member 102 and a cover 104. A first end of the housing 106 is configured to mate with a receiving socket located on a host device printed circuit board (host printed circuit board and socket not shown). The first end 106 of the housing is enclosed by a D-Shell ribbon style connector 108 which mates with the host device receiving socket. In this embodiment the D-Shell is entirely formed of metal which is integrally cast with the base member 102.

The D-Shell connector 108 includes a D-shaped shroud 110, which extends from a front end face plate 109, which extends across the front end of the module housing. The face plate 109 includes a pair of apertures 113 located on each side of the metal shroud 110, the apertures communicating with the interior of the module housing. A pair of U-shaped support channels 114 extend from the face plate 109 immediately adjacent each of the apertures 113. The support channels may be integrally cast with the remainder of base member 102. The D-Shell connector 108 further includes a contact beam 111 formed of an insulating material such as FR-4. Both the upper and lower surfaces of the contact beam have a plurality of contact elements 112 adhered thereto. When the connector 108 engages the host device socket, the contact elements 112 are held in wiping engagement against similar contact members formed within the socket. The physical connection between the contact members within the socket and the contact elements 112 allows individual electrical signals to be transmitted between the host device and the module.

The second end of the module 122, includes an end wall 124 contained partially on the base member 102, and partially on the cover 104. Mutually opposing semicircular grooves 126, 128 are formed in the end wall portions of the base member and cover respectively, such that when the cover is mated with the base member, the grooves form a circular opening in the end wall of the housing. Additionally, a plurality of cable supports 120*a*, 120*b*, 120*c* are formed on the inner surfaces of both the base member 102 and the cover 104 in axially alignment with the semicircular grooves formed in the end walls 124. Like the portions of the end wall 124 contained on the base member 102 and the cover 104, each cable support 120*a*, 120*b*, 120*c* includes a semicircular groove 130 which, when the cover and base member are joined, form a circular opening through each pair of mutually opposing cable supports. Both the semicircular grooves 126, 128 in the end wall and the semicircular grooves 130 in the cable supports include knob like radial projections or teeth 132.

The grooves 126, 128 in end wall 124 and the grooves 130 in the cable support members 120*a*, 120*b*, 120*c* act to support a flexible shielded cable 118 which protrudes from the second end of the module 100. The flexible cable includes an outer layer of insulation 134, and a metal shield 136 which surrounds a plurality of individually insulated conductors 140*a*, 140*b*, 140*c*, and 140*d*. In a first preferred embodiment, the flexible cable 118 includes four individual conductors, another embodiment requires eight conductors, and of course a cable employing any number of individual conductors may be used as required by a particular application. Installing the cable 118 in the module requires that the cable be stripped as shown in FIG. 1. First, the outer insulation 134 is stripped at 142, exposing an undisturbed section of the cable shield 136. Further down the length of the cable, the shield is stripped at 144 exposing the individual conductors 140*a*, 140*b*, 140*c*, and 140*d*. A layer of copper tape 145 may be applied to the end of the exposed shield to prevent the shield from fraying. Finally, the insulation of the individual conductors is stripped at 146 exposing the bare copper conductors 148 of each individual conductor. These exposed conductors are then soldered to contact pads 150 formed along the rear edge of printed circuit board 116.

Figure 3:
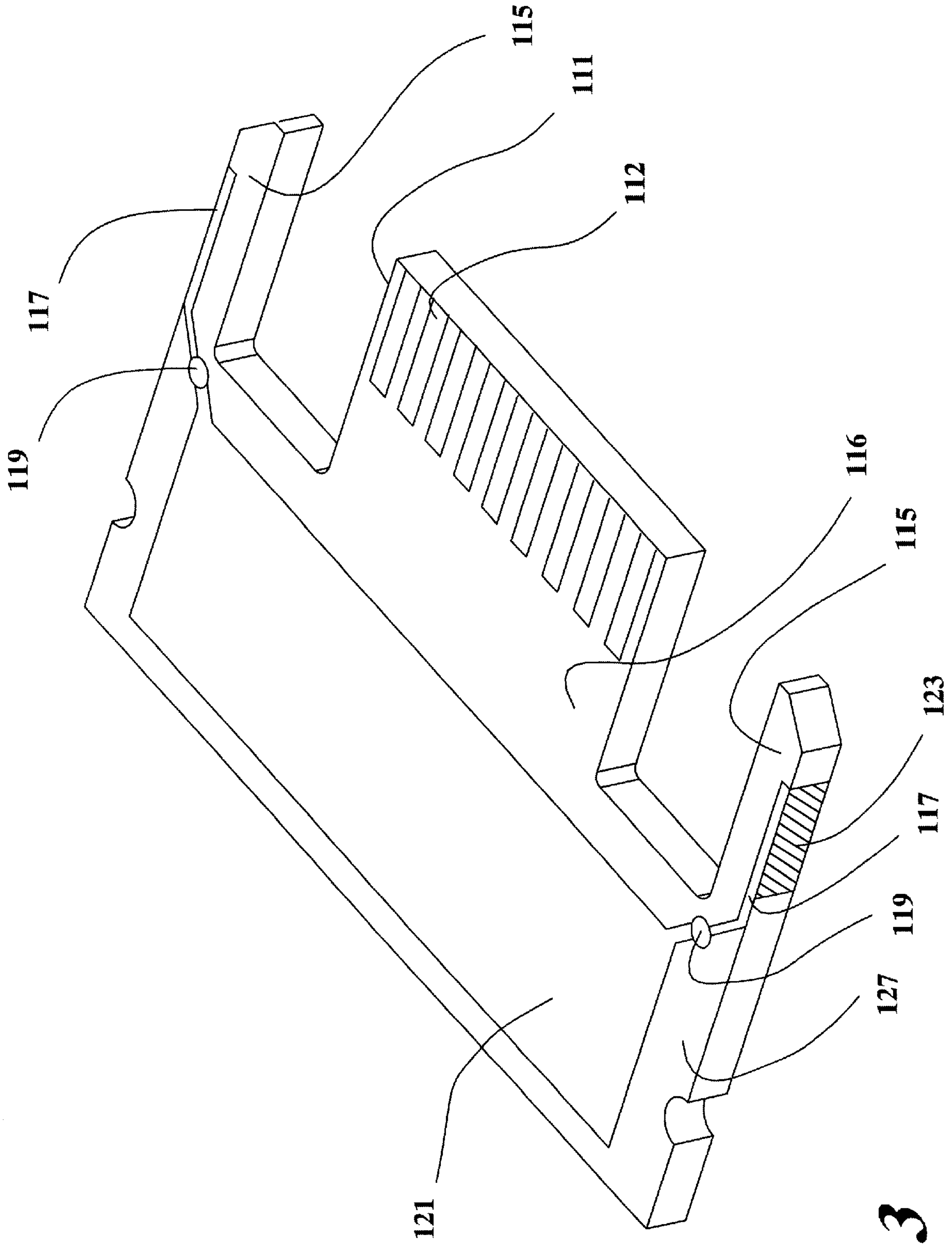
FIG. 3 is an isometric view of the printed circuit board in FIG. 2, showing the reverse side thereof.
Figure 4:
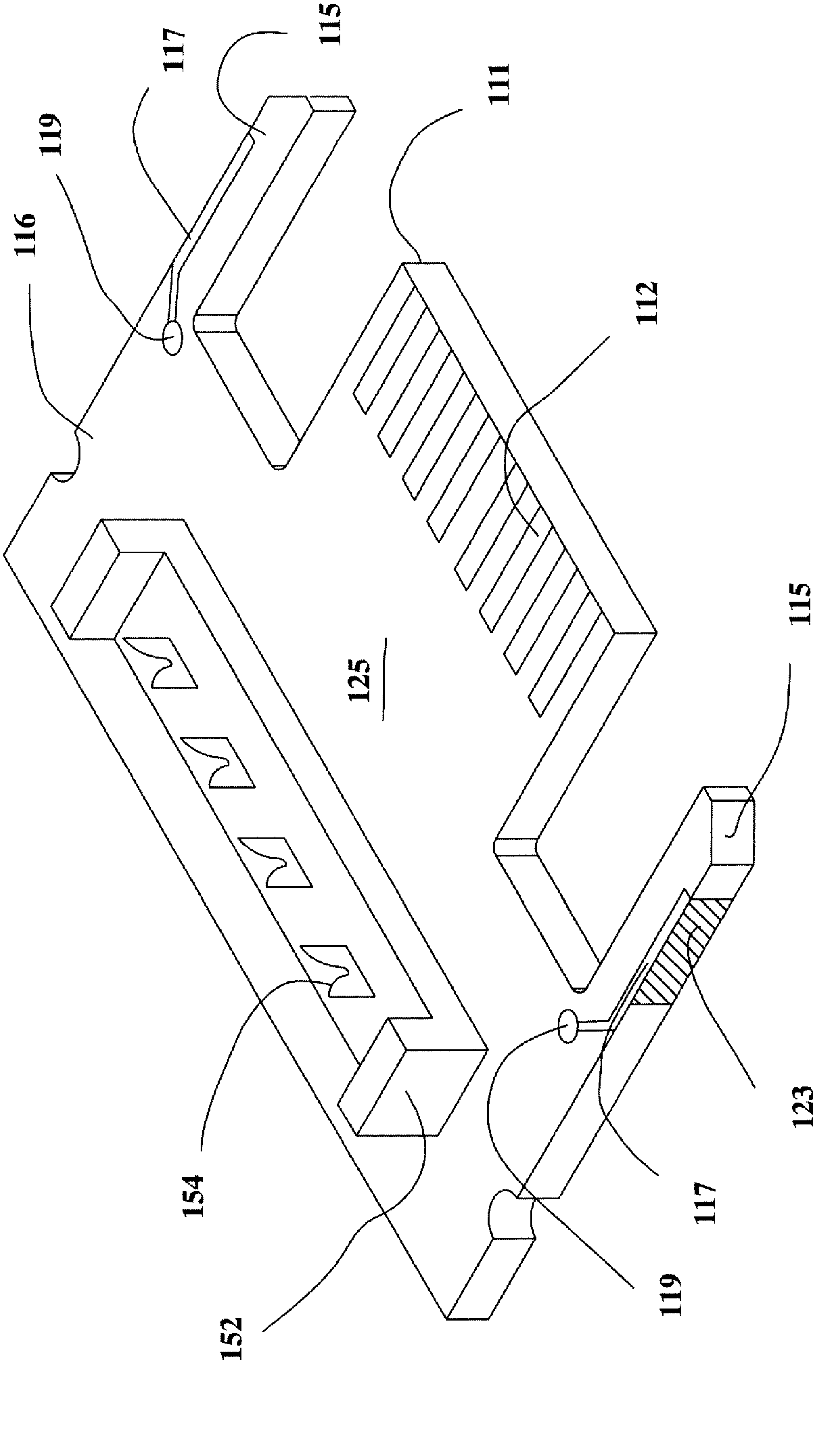
FIG. 4 is an isometric view of an alternate printed circuit board.
Figure 5:
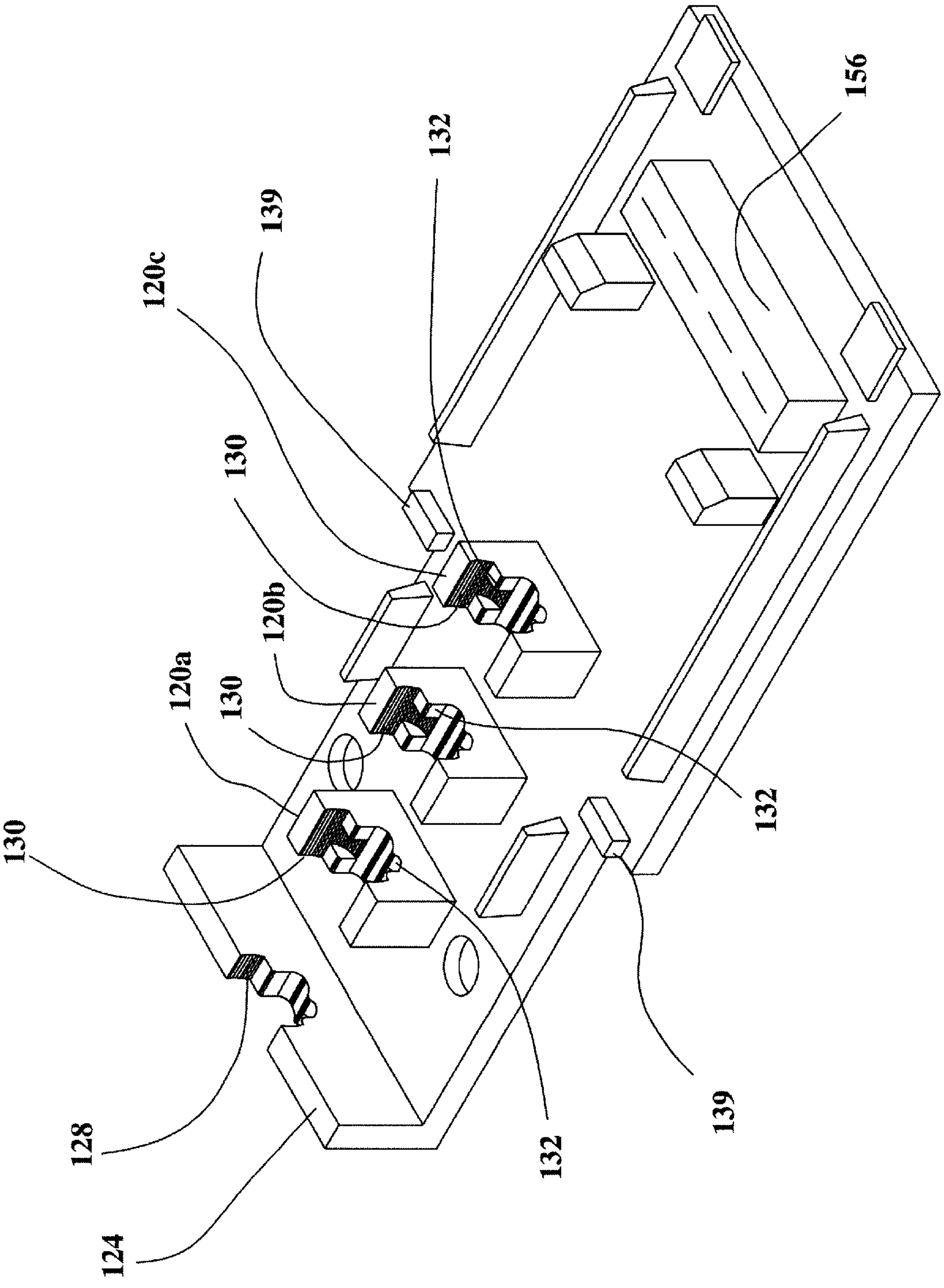
FIG. 5 is an isometric view of the module housing cover shown in FIG. 1, showing the interior surface thereof.

In an alternate printed circuit board arrangement depicted in FIG. 4, the solderpads 150 of FIG. 3 are replaced by a single insulation displacement connector 152. Mounted on the surface of printed circuit boards 116, the IDC connector includes a plurality of knife contacts configured to receive each of the individual conductors 140*a*, 140*b*, 140*c* and 140*d* of flexible cable 118. In this embodiment, the housing cover 104 includes an IDC cover 156 adhered to the inner surface of the housing cover. When the individual conductors 140 are placed over the knife contacts 154, and the cover 104 and base member 102 are assembled, the IDC cover 156 forces the conductors down onto the knife contacts 154. The knife contacts pierce the outer layer of insulation surrounding the conducts and make electrical contact with the copper conductors 148 contained therein. In this way, the module 100 may be easily field installed to a prewired copper cable.

Regardless of the attachment method, when the cable 118 is placed within the module housing, the manner in which the cable is stripped is such that the portion of the cable adjacent the end wall 124 and cable support 120*a*, nearest the end wall, includes the outer layer of insulation 134. When the module is enclosed by joining the cover 104 to the base member 102, the radial teeth 132 surrounding the mutually opposing grooves 126, 128 in the end wall and the mutually opposing grooves 130 in the first pair of cable supports 120*a*, dig into the compliant outer insulation to grip the cable and provide strain relief for the individual conductors soldered to the printed circuit board within. Further, the stripped portion of the cable wherein the metallic shield is exposed, lies adjacent the second and third cable supports 120*b*, 120*c*. The diameter of the grooves 130 formed in these supports is slightly smaller than the diameter of the grooves formed in the first cable support 120*a* and the outer wall 124. This allows the teeth 132 formed in the two inner cable supports 120*b*, 120*c* to firmly compress the reduced diameter of the exposed shield 136. The radial teeth and the cable supports themselves are formed of metal cast with the base member 104. Therefore, when the module is assembled, the cable shield will be electrically bonded to the module housing. Thus, when the module is assembled and inserted into a host device chassis where the module housing will contact the host device chassis ground, the entire module, including the cable shield 136 shield will be held at the same electrical potential as the chassis ground.

Referring now to FIGS. 6*a*, 6*b*, 6*c*, and 6*d*, the remote end of the flexible cable 118 includes a media connector 158. The media connector may be of nearly any style which is compatible with the serial interface requirements of the communication system. Since the preferred embodiment of the invention is to comply with the GBIC specification, the preferred copper connectors are a DB-9 male connector, FIG. 6*a* or an HSSDC connector, FIG. 6*b*. It is also possible to mount an optoelectronic transceiver at the end of the flexible connector such as in FIG. 6*d*, allowing the module to adapt to a fiber optic transmission medium. Another alternate configuration is to connect a second GBIC module directly to the remote end of the flexible cable, FIG. 6*c*. In this arrangement, the first GBIC may be plugged into a first host system device, and the second module plugged into a second system host device, with the flexible cable interconnected therebetween. The flexible cable acts as a serial patch cord between the two host devices, with a standard form factor GBIC module plugged into the host devices at either end. In a purely copper transmission environment, this arrangement has the advantage of eliminating a DB-9 connector interface at each end of the transmission medium between the two host devices.

Returning to FIGS. 1, 2 and 3, in the preferred embodiment of the invention, the contact beam 111 of connector 108 is formed directly on the front edge of printed circuit board 116. In this arrangement, the contact beam protrudes through a rectangular slot formed in the face plate 109 within the D-shaped shroud 110. The contact elements 112 can then be connected directly to the circuitry on the printed circuit board which is configured to adapt the data signals between the copper transmission medium of the host device to the particular output medium of the module 100. Also extending from the front edge of the printed circuit board is a pair of guide tabs 115 located on each side of the contact beam 111. The guide tabs are configured to protrude through the apertures 113 formed in the face plate 109. Each guide tab is supported by the corresponding U-shaped channel 114 located adjacent each aperture. As can be best seen in FIGS. 2 and 3, each guide tab 115 includes an outer edge 123, which is coated or plated with a conductive material. The conductive material on the outer edge 123 of the guide tabs 115 is further electrically connected to narrow circuit traces 117, approximately 0.010" wide, located on both the upper 125 and lower 127 surfaces of the printed circuit board. The conductive traces 117 extend along the surfaces of the printed circuit board to conductive vias 119 which convey any voltage present on the traces from one side of the board to the other. On the lower surface 127 of the printed circuit board 116 the conductive vias are connected to the circuit ground plane 121 of the module.

The arrangement of the printed circuit board 116 and D-Shell connector 108 just described provide for proper signal sequencing when the module 100 is inserted into the receiving receptacle of a host device. As the connector 108 slides into a mating receptacle, the guide tabs 115 are the first structure on the module to make contact with the mating receptacle. The metal coating 123 on the outer edge of the tabs makes contact with a similar structure within the socket prior to any of the contact elements 112 mating with their corresponding contacts within the receptacle. Thus, the guide tabs 115 provide for static discharge of the module 100 prior to power being coupled to the module from the host device. The traces 117 formed along the upper and lower surfaces of the guide tabs are maintained as a very narrow strip of conductive material along the very edge of the guide tabs in order to provide as much insulative material between the static discharge contacts 123 and the metal U-shaped support channels 114. The U-shaped channels provide additional rigidity to the guide tabs 115.

In the preferred embodiment of the invention, the module 100 further includes longitudinal sides 131 extending between the first end 106 and second end 122 of the module housing. Latching members 133 associated with the longitudinal sides are provided to releasably secure the module 100 within the host receiving receptacle when the module is inserted therein. The latching members are formed of flexible plastic beams having a mounting base 135 configured to engage a slotted opening 137 formed within the side of base member 104. The mounting base 135 anchors the latching member within the slotted opening 137 and a brace 139 protruding from the inner surface of cover 104 acts to maintain the mounting base 135 within the slotted opening 137. The latching members further include latch detents 141 and release handles 143. As the module 100 is inserted into a receptacle, the latching members 133 are deflected inward toward the body of the housing. The angled shape of the latch detents allow the detents to slide past locking structures such as an aperture or stop formed on the inner walls of the receptacle. Once the detents slide past the locking structures, the latching members elastically spring outward, and the latch detents engage the locking structures, and the module is retained within the receptacle. To release the module, the release handles 143 must be manually squeezed inwardly until the latching detents clear the locking structures. At that point the module may be withdrawn from the socket with little difficulty.

Figure 6A:
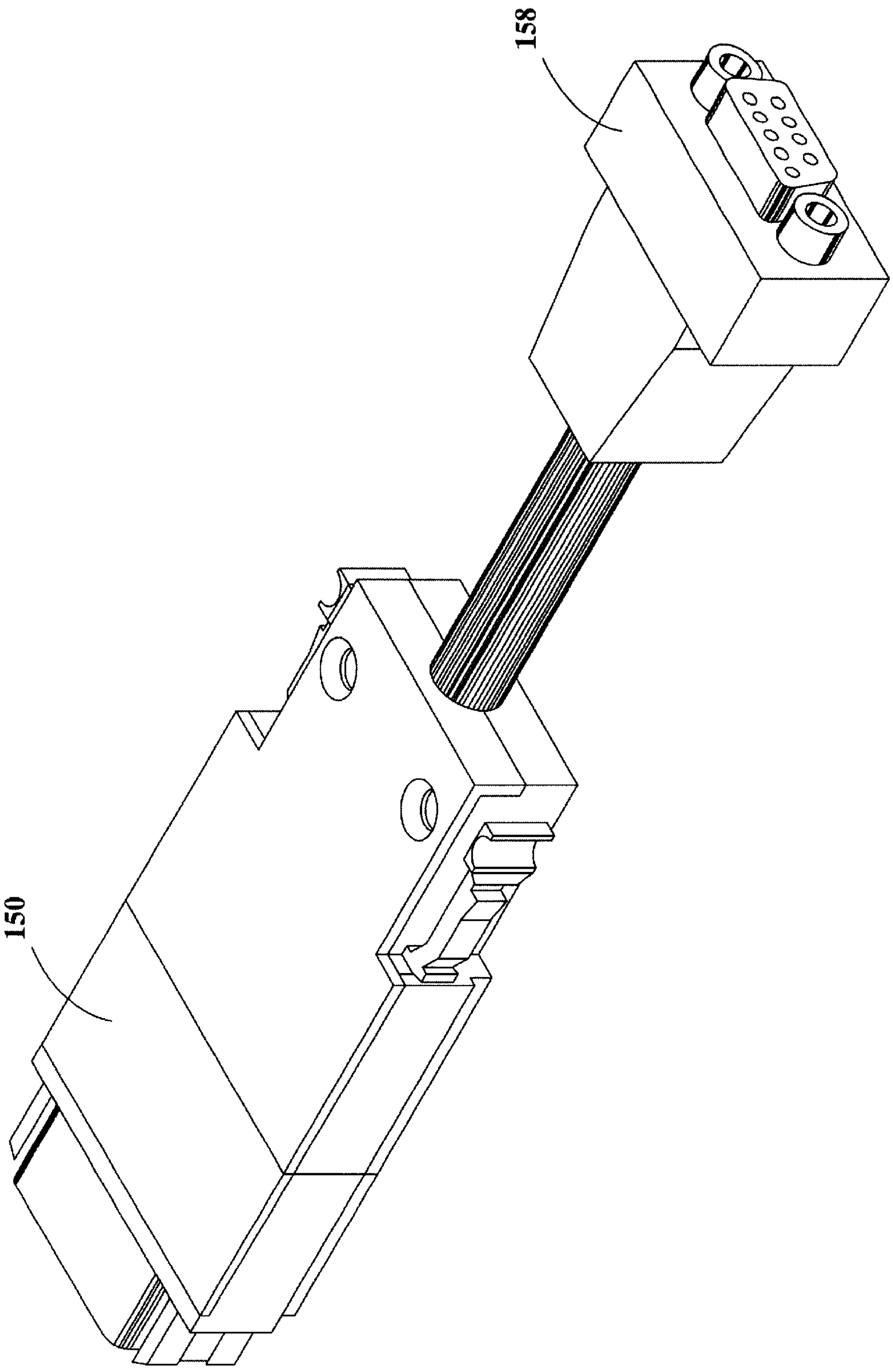
FIGS. 6*a*, 6*b*, 6*c* and 6*d* are isometric views of various interface converter modules according to the present invention, showing alternate media connectors including.
Figure 6B:
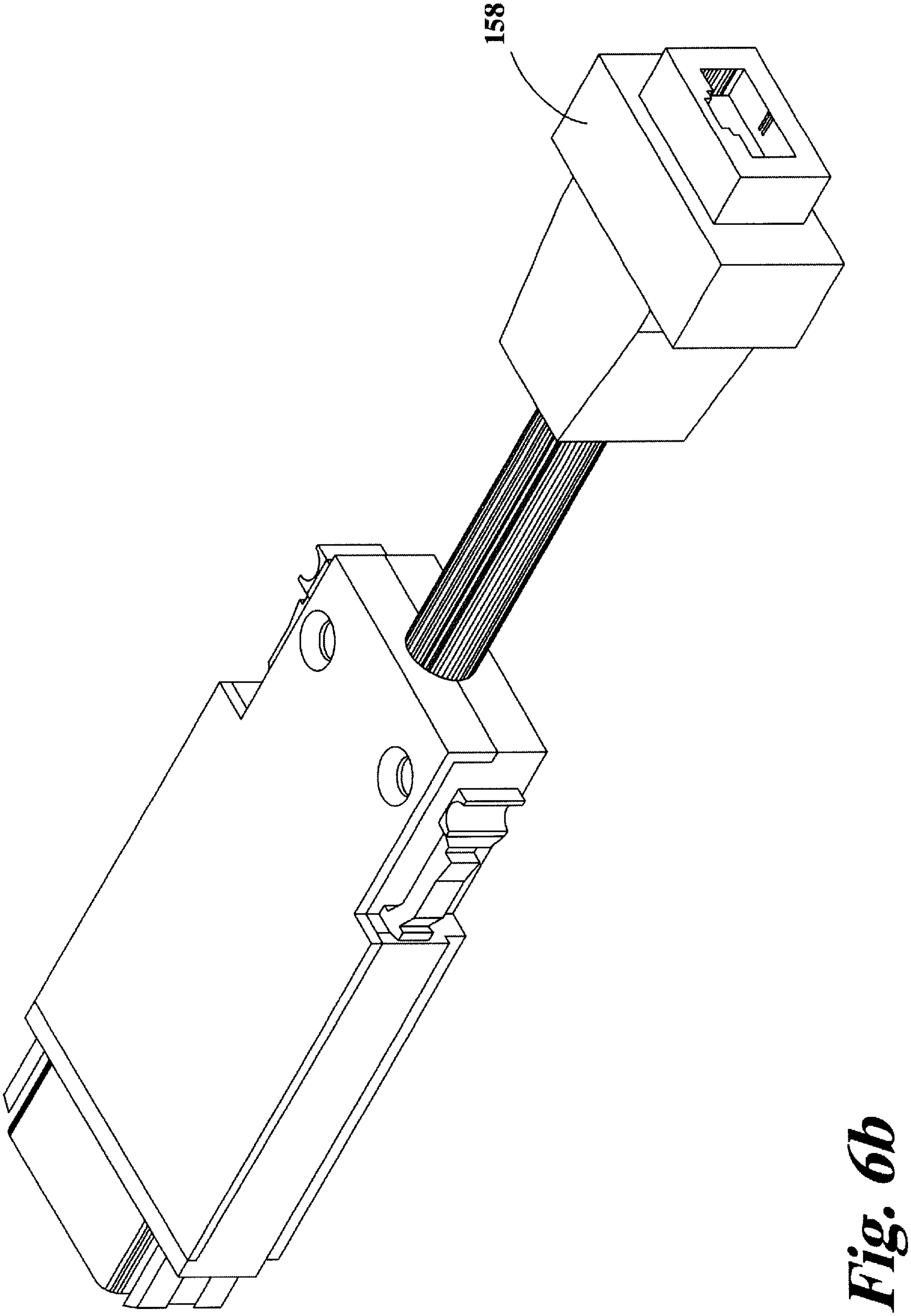
Figure 6C:
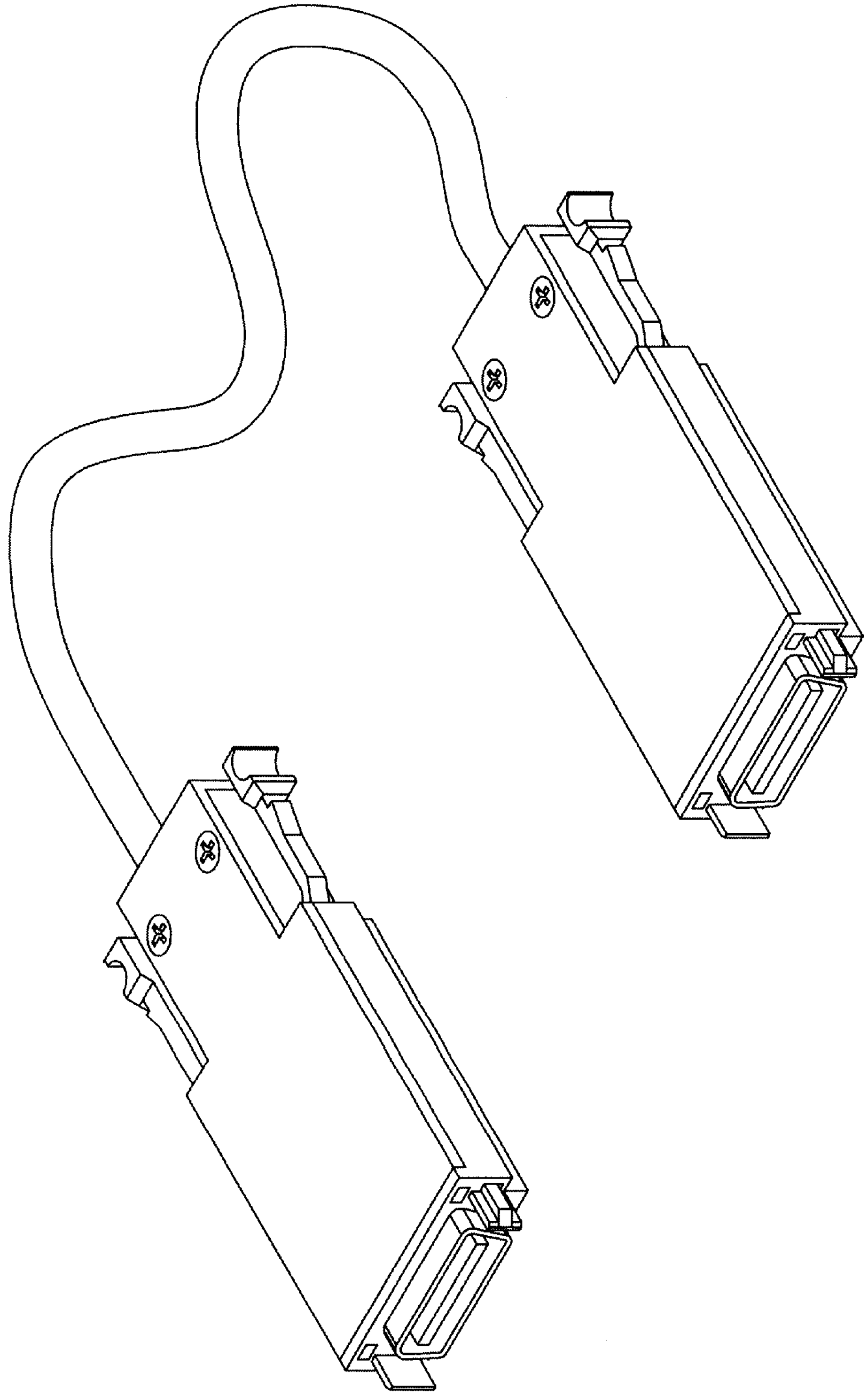
Figure 6D:
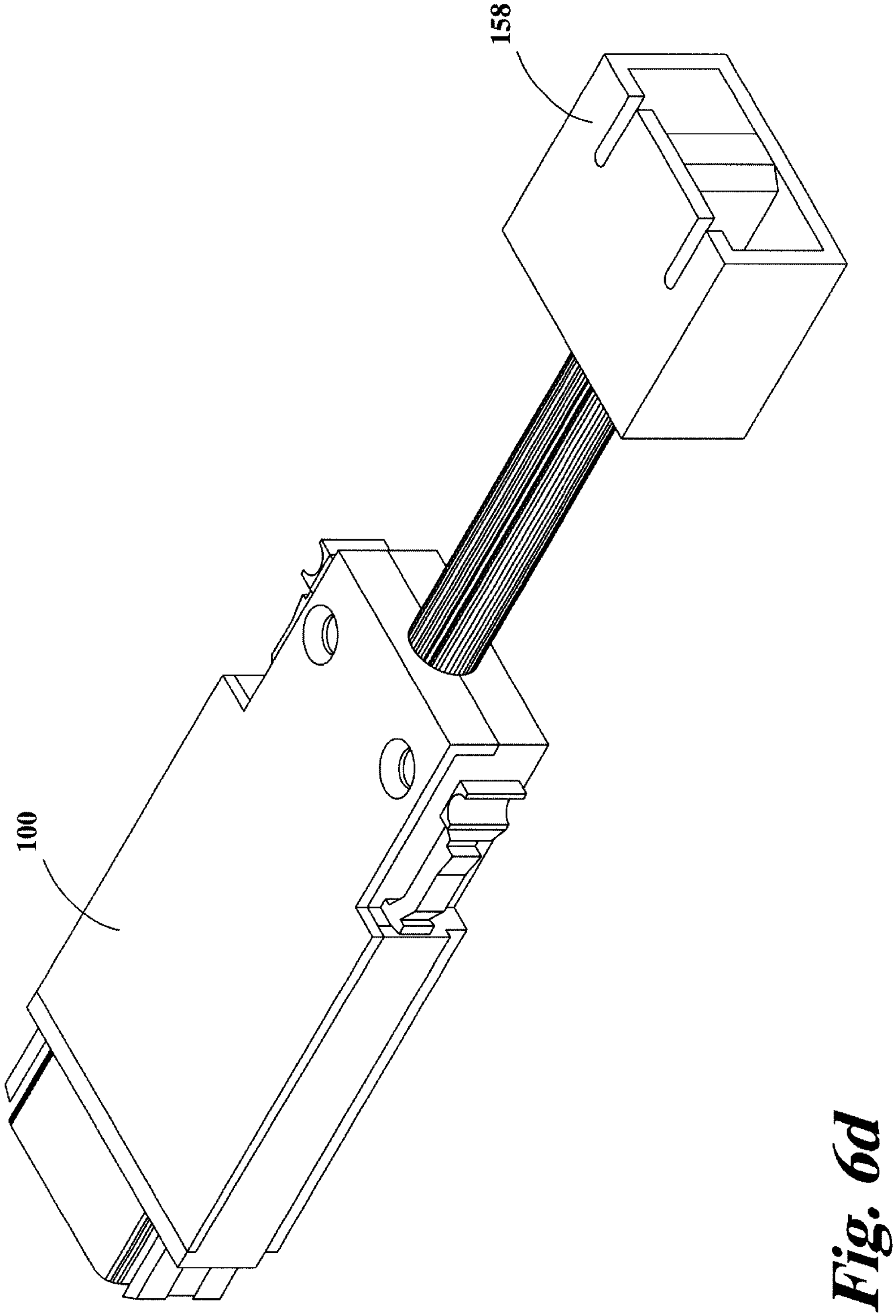

Referring again to FIGS. 1 and 5, an alternate embodiment to that just described is to form the housing base member 102 and cover 104 of a plastic material. In such an embodiment, the latch members 133 may be integrally molded directly with the base member 104. The D-Shell connector 108, however, requires a metal D-shaped shroud 110. Therefore, in this alternate embodiment the D-Shell connector must be provided separately from base member 104. Also, a plastic module housing will not be effective in reducing spurious electromagnetic emissions from leaking from the module. Therefore, some type of shielding must be provided at the second end 122 of the module to prevent such emissions from escaping the host device chassis when the module housing is inserted therein. As with prior art interface converter modules, this shielding may be provided by metallizing the plastic comprising the second end of the module, or by enclosing the second end of the module in a metal sheath 150 as is shown in the module of FIG. 6*a*. Regardless of the manner in which the shielding is supplied, all that is necessary is that the second end of the module be encased within a conductive material, and that the conductive material contact the host chassis when the module is inserted into the host device.

Returning to FIGS. 1 and 5, if the base member and cover are formed of plastic according to this alternate embodiment, the cable supports 120*a*, 120*b* and 120*c* must be formed of a conductive material separate from the base member 102 and cover 104. Furthermore, when the supports are joined to the base member 104 and the cover, provisions must be made for electrically connecting the conductive cable supports to the conductive material encasing the second end of the module. In this way, the cable shield 136 will be bonded to the outer conductive portion of the module, and the aperture in the end wall 124 through which the cable 118 exits the module will be electromagnetically sealed to block spurious emissions.

Figure 7:
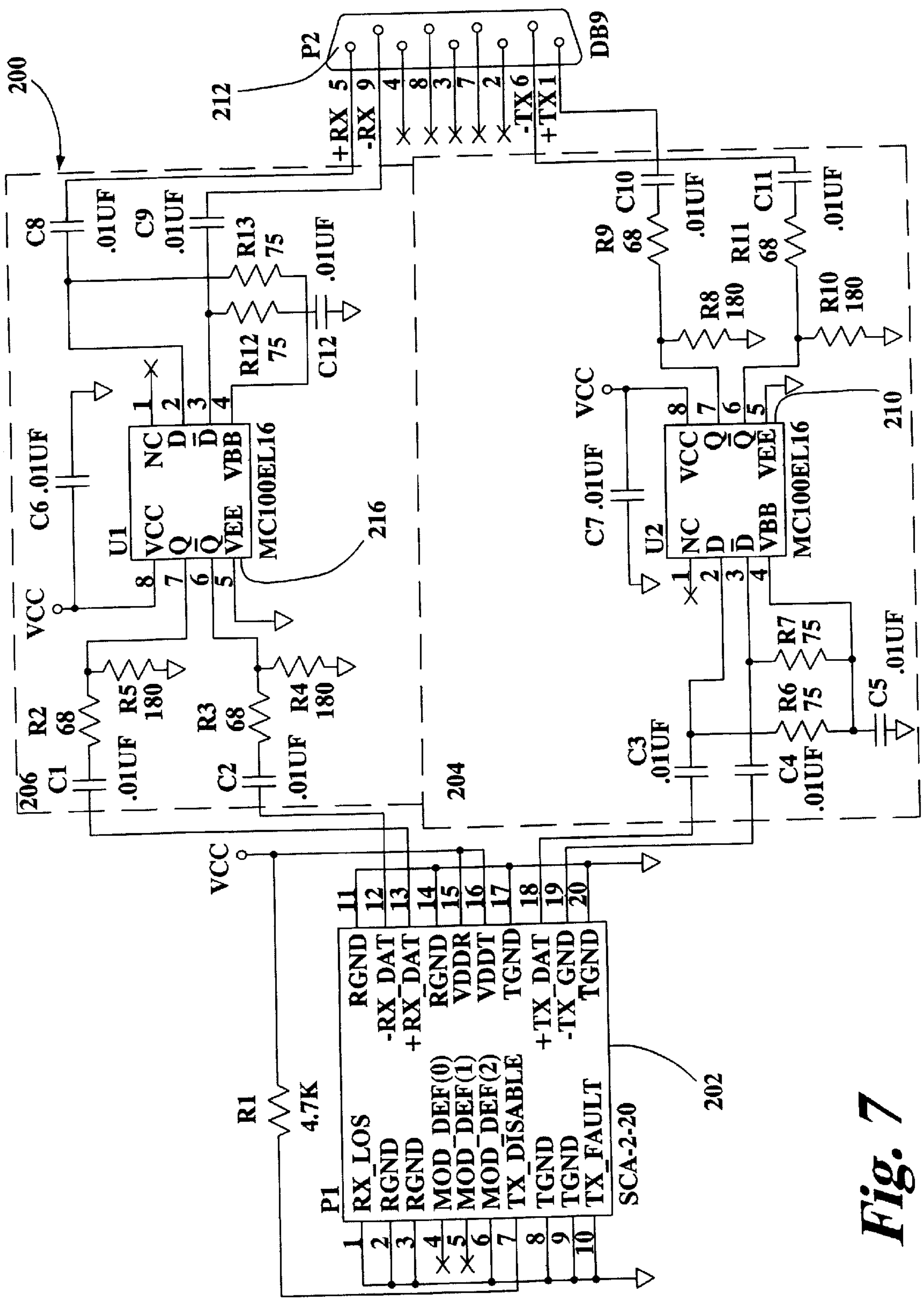
FIG. 7 is a schematic diagram of a passive copper GBIC according to the preferred embodiment of the invention.

Turning to FIG. 7, a schematic diagram of a passive "copper GBIC" module 200 is shown according to a preferred embodiment of the invention. The module includes a host connector 202. As shown, contacts 1–3, 6, 8–11, 14, 17, and 20 of connector 202 are all connected ground, and contacts 4 and 5 are left unconnected. Contacts 12 and 13 represent the differential receive data inputs, contacts 15 and 16 are connected to the receive and transmit voltage supply $V_{CC}$, and pins 18 and 19 represent the differential transmit data outputs. A 4.7 KΩ resistor $R_1$ connects to the transmit disable pin 7, which disables the transmitter when $V_{CC}$ is not present.

The transmit portion of the module is shown within block 204. The transmit circuit includes 0.01 $\mu$F AC coupling capacitors $C_3$ and $C_4$, and 75Ω termination resistors $R_6$ and $R_7$. Resistors $R_6$ and $R_7$ form a 150Ω series resistance between the +transmit and the –transmit differential signal lines. The junction between $R_6$ and $R_7$ is AC coupled to ground by 0.01 $\mu$F capacitor $C_5$. The +transmit and –transmit signal lines are connected to the D and –D inputs of non-inverting PECL signal driver 210. Signal driver 210 acts as a buffer between the host device output drivers and the serial output transmission medium. Outputs Q and –Q of signal driver 210 are connected to the +transmit and –transmit signal lines of the serial transmission medium respectively. 180Ω resistor $R_8$ and 68Ω resistor $R_9$ provide proper output biasing and termination of the +transmit signal, and capacitor $C_{10}$ AC couples the +transmit signal to the serial transmission medium. Similarly, 180Ω resistor $R_{10}$ and 68Ω resistor $R_{11}$ bias the output and series terminate the –transmit signal, which is AC coupled to the serial transmission medium through capacitor $C_{11}$. The +transmit and –transmit signals are connected to the transmission medium via pins 1 and 6 of the DB-9 connector 212 respectively.

The receive portion of the module is shown within block 206. The receive circuit includes 0.01 $\mu$F AC coupling capacitors $C_8$ and $C_9$, and 75Ω termination resistors $R_{12}$ and $R_3$. Resistors $R_{12}$ and $R_{13}$ form a 150Ω series resistance between the +receive and the –receive 214 differential signal lines. The junction between $R_{12}$ and $R_{13}$ is AC coupled to ground by 0.01 $\mu$F capacitor $C_{12}$. The +receive and –receive signal lines are connected to the D and –D inputs of non-inverting PECL signal driver 216. Signal driver 216 acts as a buffer between the remote device output drivers and the receiving circuit of the host device. Outputs Q and –Q of signal driver 216 are connected to the +receive and –receive signal pins of the host connector 202. 180Ω resistor $R_5$ and 68Ω resistor $R_2$ provide proper output biasing and series termination of the +receive signal from the signal driver 216, and capacitor $C_1$ AC couples the +receive signal to the host device. Similarly, 180Ω resistor $R_4$ and 68Ω resistor $R_3$ provide biasing and series terminate the –receive signal, which is AC coupled to the serial transmission through capacitor $C_2$. The +receive and –receive signals are connected to the host device via contact elements 13 and 12 of connector 202 respectively.

The schematic diagram just described represents the preferred embodiment of a passive "copper GBIC" interface converter module. Alternate schematics are known in the art, and it is well within the ordinary level of skill in the art to substitute more sophisticated circuit embodiments for the passive design disclosed herein. Such substitution would not require any undue amount of experimentation.

Figure 8:
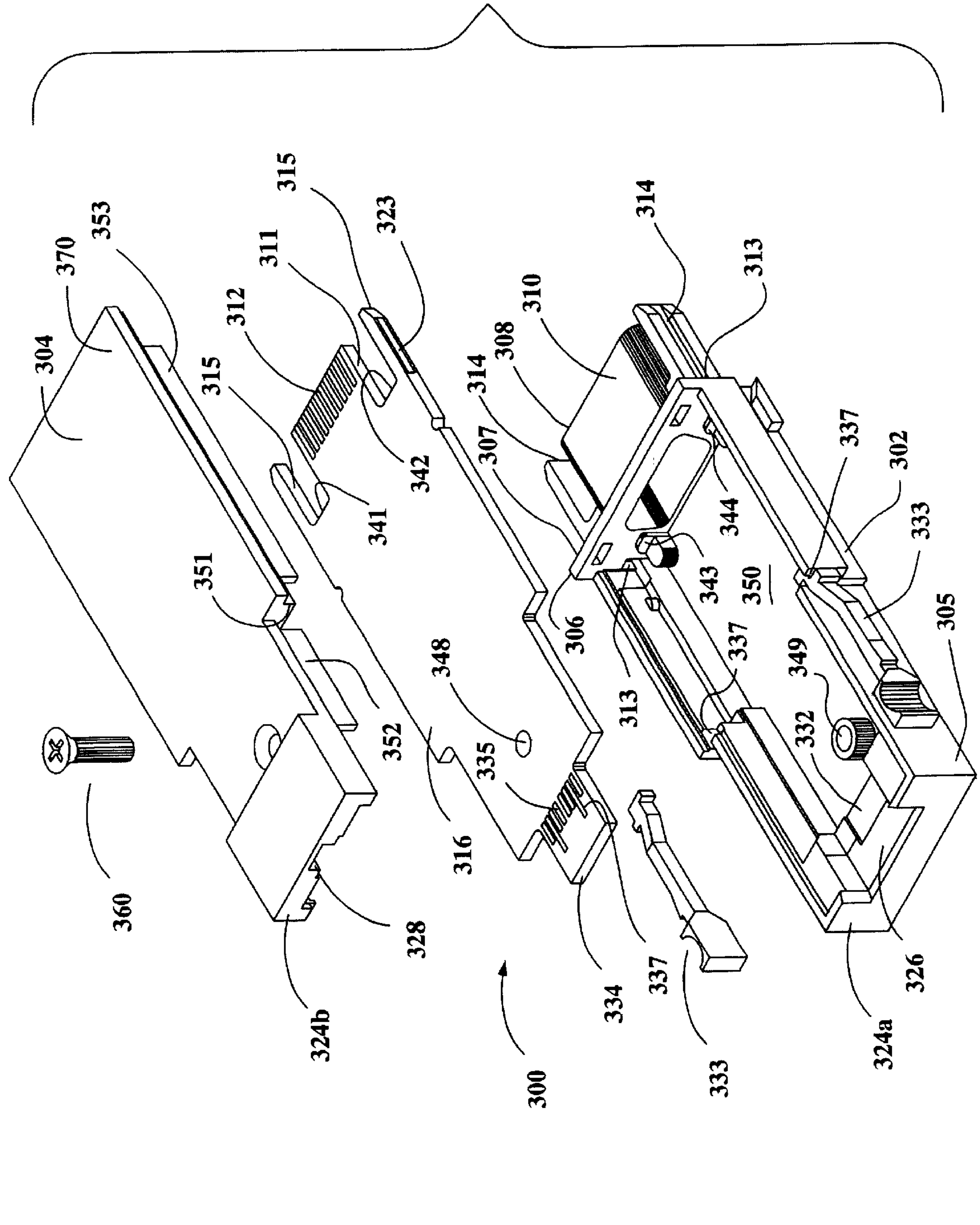
FIG. 8 is an isometric exploded view of an additional embodiment of an interface module looking down into the base.
Figure 9:
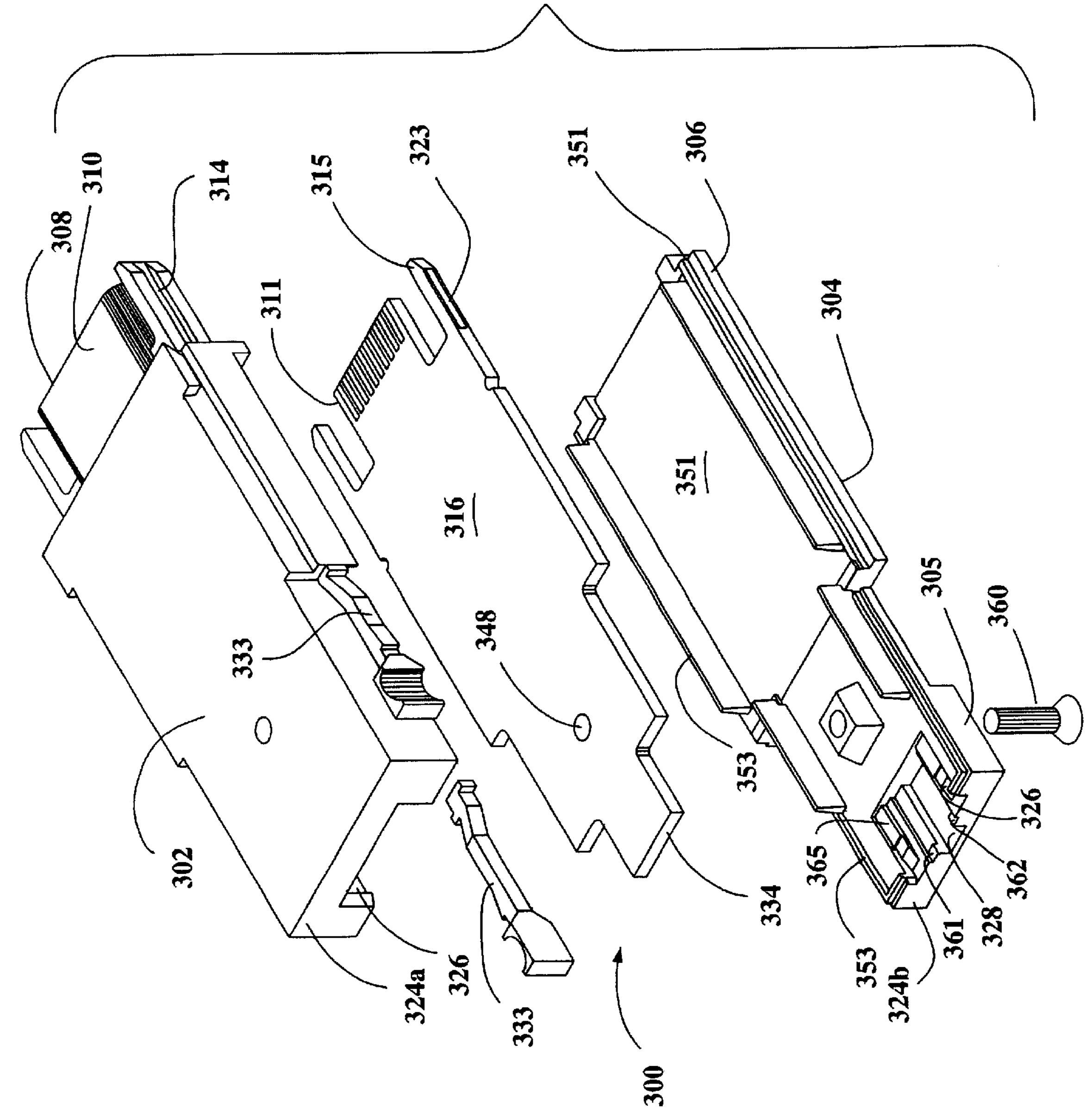
FIG. 9 is an isometric exploded view of the interface module of FIG. 8 looking down into the cover.

FIGS. 8 and 9 disclose an additional embodiment of the present invention showing an interface module 300 in an isometric exploded view. This embodiment of the interface module 300 conforms to the GBIC specification as discussed previously. The module 300 includes a two-piece die-cast metal housing including a base member 302 and a cover 304. A first end of the housing 306 is configured to mate with a receiving socket located on a host device printed circuit board (not shown). The first end 306 of the housing is enclosed by a D-shell ribbon style connector 308 which mates with the host device receiving socket. In this embodiment the D-shell is entirely formed of metal which is integrally cast with the base member 302.

The D-shell connector 308 includes a D-shaped shroud 310, which extends from a front end face plate 309, which extends across the front end of the module housing. The faceplate 309 includes a pair apertures 313 located on each side of the metal shroud 310. The apertures 313 communicated with the interior of the module housing. A pair of U-shaped support channels 314 extends from the faceplate 309 immediately adjacent the apertures 313. The support channels may be integrally cast with the base member 302. The D-shell ribbon style connector 308 is completed by the mounting of the printed circuit board 316 within the base 302. The end of the printed circuit board 316, forms a contact beam 311 that forms the mating male connector portion of the male ribbon style connector 308. The contact beam 311 includes a plurality of contact elements 312 adhered to the upper and lower surface of the contact beam 311. The assembly of the printed circuit board 316 within the base 302 will be discussed in more detail below.

Also extending from the front edge of the printed circuit board is a pair of guide tabs 315 located on each side of the contact beam 311. The guide tabs are configured to protrude through the apertures 313 formed in the base plate 309 of the base 302. Each guide tab is supported by a corresponding U-shaped channel 314 located adjacent each aperture 313. Each guide tab 315 includes an outer edge 323 that is coated or plated with a conductive material. The conductive material on the outer edge 323 of the guide tab 315 is further electrically connected to narrow circuit traces in the printed circuit board 316 and extend along the surfaces of the printed circuit board to conductive vias which convey voltage present on the traces on one side of the board to the other. The conductive edges 323 are electrically connected to the circuit ground plane of the module.

The second end 305 of the module 300 includes an end wall 324*a* and 324*b*. The end wall 324*a* is contained on the base member 302 and the end wall 324*b* is included in the construction of the cover 304. When the cover 304 is mounted to the base 302, the end wall 324*a* and 324*b* are joined together and form a receptacle opening 326 for receiving a media plug or connector. The media receptacle opening 326 is generally rectangular shaped. In a preferred embodiment this media receptacle opening is formed to conform to the specified outer package dimensions for an HSSDC plug (as disclosed ANSI X3TI 1/DC-0. ANSI X3TII and ANSI X3T10.1 for High Speed Serial Data Connector). The end wall 324*b* includes in the opening a slot 328 for receiving the latch member of an HSSDC plug. The opening 326 in the base 302 includes a depression 332 formed therein for receiving the mating portion 334 of the printed circuit board 316 when the printed circuit board is mounted within the base 302. The mating portion 334 of the printed circuit board 316 includes contact traces 335 adhered to the printed circuit board 316 and provide for the mating contacts with the HSSDC plug contacts to be inserted with the media receptacle opening 326. Therefore, it can be understood that the printed circuit board 316 is formed in one piece that forms both the mating contacts 335 for the media receptacle opening 326 at the second end 305 and the mating contacts 312 for the ribbon style connector 308 at the first end 309. The printed circuit board 316 is formed to connect the contract traces 335 with the appropriate contact fingers 312 so that the signals from a media plug, such as an HSSDC plug, can be transferred from the second end 305 of the interface module to the first end 309 of the interface module via a contact fingers 312 and the host device to which the male ribbon style connector 308 is connected. Also included in the printed circuit board 316 are circuitry and other components including resistors and capacitors and other desired active devices such as those discussed previously in order to make the interface module compliant with the GBIC specifications. The mating end 334 of the printed circuit board 316 also includes contact fingers 337 that are offset from contact fingers 335 in order to provide for the staged mating of the contacts to provide for power sequencing or "hot plugging."

In a preferred embodiment, the module 300 is assembled according to the following steps. The printed circuit board 316 is lowered into the interior 350 of the base 302 and the guide tabs 315 are inserted into apertures 313 while the contact beam 311 is inserted within the D-shaped shroud 310. The entire board 316 is then slid forward toward the first end 309 of the base 302 until the abutment surfaces 341, 342 of the printed circuit board 316 abut against support member 343, 344 respectively of the base 302. Sliding of the board into its fully mated position will provide for the guide tabs 315 to be located in U-shaped channels 314 so that the front edge of the guide tab 315 is adjacent to the front edge of the U-shaped channel 314. Simultaneously, the contact beam 311 is centered within the D-shaped shroud 310 of the connector 308.

The rear end of the board including the mating portion 334 is dropped into the depression 332 and fastening aperture 348 is aligned with the base aperture 349. Latch members 333 are then mounted in slotted openings 337. The cover 304 is then mounted onto the base 305. The cover 304 includes edges 351 and walls 352, 353 that intermate with the walls of the base 305 in order to aid in the sealing of the module 300 and to provide a conductive seal around all of the edges of the module in order to prevent leakage of electromagnetic fields from the module. Fastening member 360 is then inserted through the cover 304 through the apertures 348 and the printed circuit board and into the aperture 349 of the base in order to secure the cover 304 to the base 305 and to secure the printed circuit board 316 therein. Simultaneously the latch members 333 are captured between the cover 304 and the base 305.

The assembled module 300 provides for many of the same features required of a GBIC as discussed previously such as the proper signal sequencing when the module 300 is inserted into a receiving receptacle of a host device (note shown). In a preferred embodiment, the housing of module 300 is formed of a die-cast conductive housing formed by the base 305 and the cover 304. At least a portion of the first end 309 is conductive. For example, a conductive surface portion 370 at the first end of the module will be the first portion of the module 300 to contact a host receptacle opening. The host receptacle opening will include conductive portions connected to chassis ground. Thus by forming the module 300 of a conductive material, conductive portion 370 will act to dissipate static electricity from the module to chassis ground of the host device upon the initial insertion step of the module 300 into the host receptacle and also provide for electromagnetic shielding and therefore an FCC complaint module. Additionally, as the connector 308 of the module 300 slides further into a mating host receptacle, the tabs 315 are the first structure on the module to make contact with a mating host receptacle connector. The metal coating 323 on the outer edge of the tabs makes contact with a similar structure within the host socket prior to any of the contact elements 312 mating with their corresponding contacts within the receptacle. Thus, the guide tabs 315 provide for static discharge of the module 300 prior to power being coupled to the module from the host devices. The traces 317 formed along the upper and lower surfaces of the guide tab are maintained as a very narrow strip of conductive material along the very edge of the guide tabs in order to provide as much insulated material of the guide tab 315 such as FR-4, between the static discharge contacts 323 and the metal U-shaped support channels 314. The U-shaped channels provide additional rigidity to the guide tabs 315.

Turning to FIG. 9 the module 300 of FIG. 8 is shown in an isometric exploded view but inverted from the view shown in FIG. 8. In other words, FIG. 9 shows the interior 351 of the base 304; the base 304 now being at the bottom of the drawing. Like numerals described in FIG. 8 are marked for FIG. 9 and will not be discussed again herein. The second end 305 of the base 304 includes receptacle opening 326. The receptacle opening 326 is formed to include slot 328 for receiving the latch arm of an HSSDC plug (not shown). Adjacent the slot 328 are protrusions 361, 362. Upon insertion of the latch arm into the slot 328 the latch will ride up and over the protrusions 361, 362. Upon full insertion of the HSSDC plug into the receptacle opening 326 the latch arm will snap past the protrusions 361, 362. The receptacle opening 326 also includes ramped portions 365 for guiding the insertion of the HSSDC plug therein. It should be noted that the interior of the media receptacle opening 326 including ramps 365, slot 328 and protrusions 361, 362 are also conductive and upon insertion of the HSSDC plug therein, grounding of the plug to the module 300 will occur. Therefore, it may be understood that a GBIC module including an HSSDC receptacle can be formed quickly and inexpensively, in that the HSSDC receptacle is formed as part of the cover 304 and the base 302 and a separate connector need not be manufacture or purchased and mounted within the housing. Further, the use of the printed circuit board 316 as the contact member 312, 335 also simplifies the assembly and construction of the module. Further, the design of the module housing of a conductive material provides for a well sealed and shielded module to provide for an FCC complaint module. Forming the end 324*a*, 324*b* of the housing of a conductive material provides for the sealing of the opening in the host device when the module 300 is mounted therein. The all conductive housing provides for the least amount of electromagnetic interference and the maximum amount of shielding for such a device. As well, additional members such as an internal shield may be provided as part of the housing or mounted separately within the housing in order to provide more shielding in order to alleviate electromagnetic leakage both when the module has a media plug inserted in the opening 326 and when the opening is empty.

Figure 10:
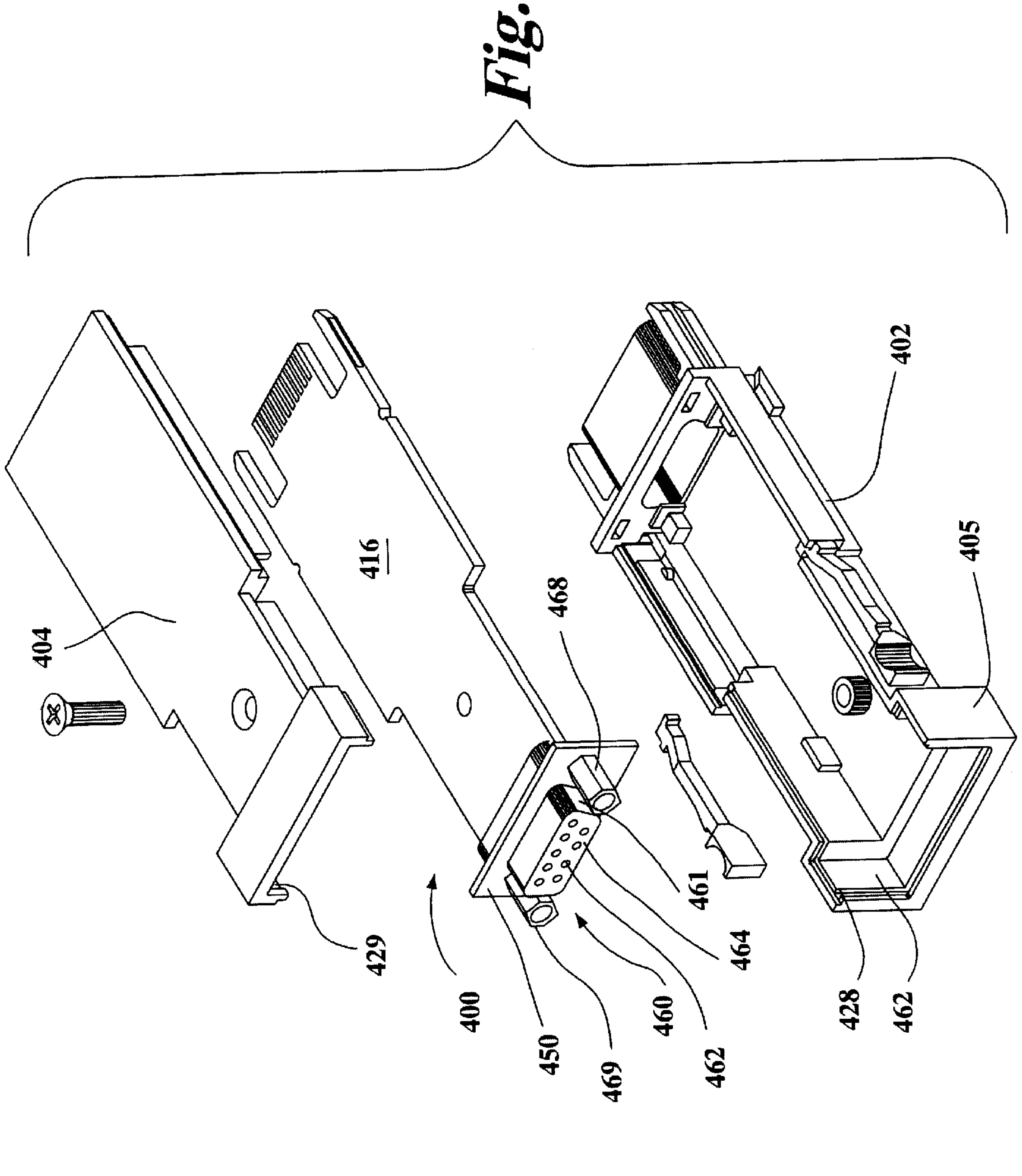
FIG. 10 is an isometric exploded view of another embodiment of the present invention viewed from the second end of the interface module.
Figure 11:
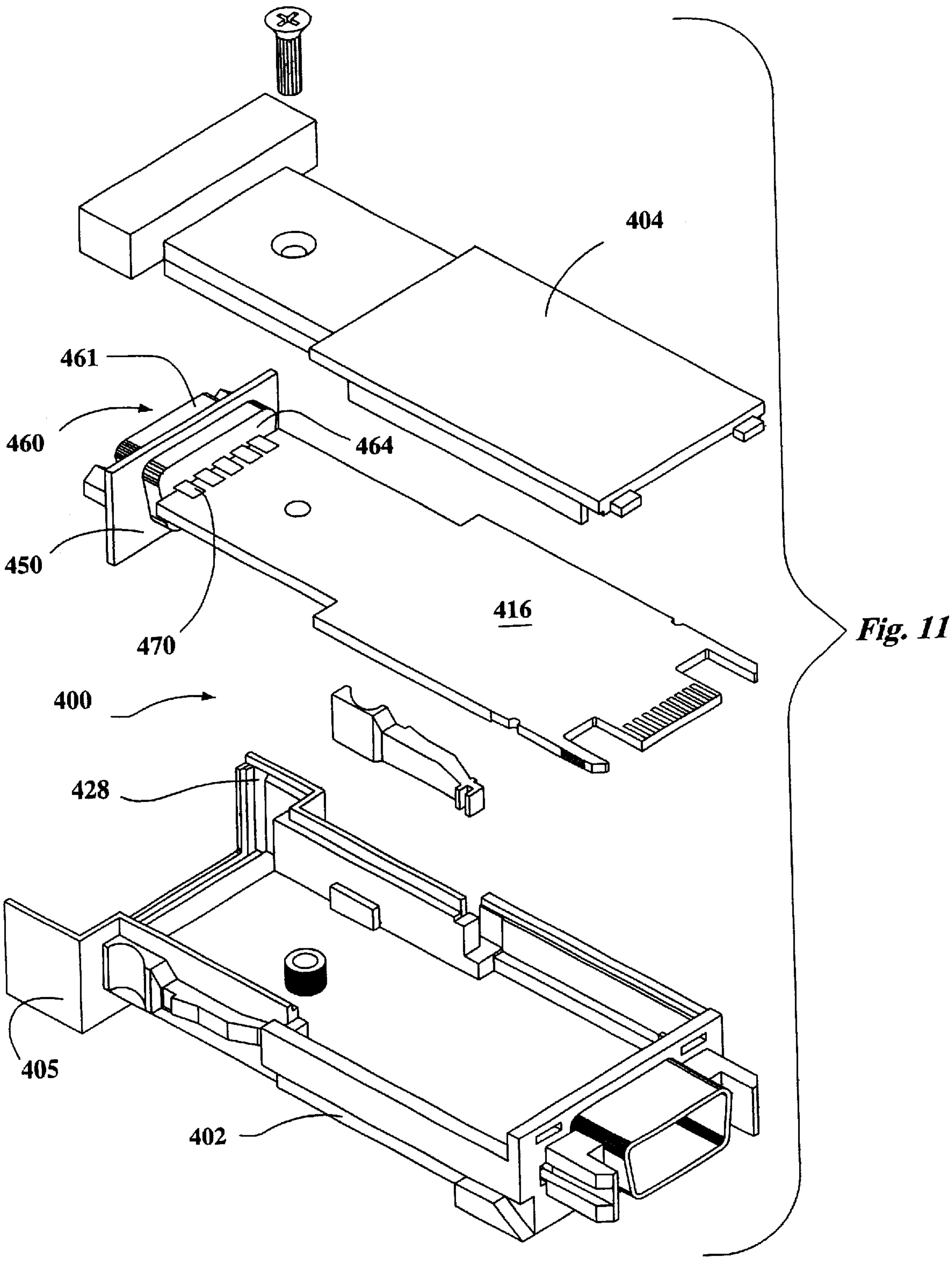
FIG. 11 is an isometric exploded view of the embodiment of the interface module of FIG. 10 viewed from the first end.

Turning to FIGS. 10 and 11 another embodiment of the present invention is disclosed. Generally the improvement disclosed in the embodiment FIGS. 10 and 11 is the use of a DB-9 connector 460 mounted to the housing of the module 400. The other portions of the module, such as the pluggable male ribbon connector and the assembly of the cover to the base are similar as to what was discussed previously and will not be repeated. The module 400 includes base 402 and cover 404. In a preferred embodiment the base and the cover are formed of a conductive material such as die-cast metal. At the second end 405 of the module 400 is a media receptacle 462 is formed including a slot 428 for receiving the edge of a face plate 450 of an assembled media connector 460. In the preferred embodiment the media connector 460 is a DB-9 connector including a D-shaped metallic shroud 461, 9-pin receptacles 462 formed in an insulator 464 and locking nuts 468, 469. Turning to FIG. 11 it may be seen that the insulator 464 includes contact terminals 470 protruding from the back side of the media connector 460. The contact terminals 470 are mounted to the printed circuit board 416. By sliding the conductive face plate 450 within the slots 428 at the second end 405 of the base 402 while simultaneously mounting the printed circuit board 416 within the base 402, the printed circuit board and the connector 460 are aligned within the base 402. The cover 404 also includes corresponding slots 428 of the base 402 and slot 429 of the cover 404. As the entire base 402 and cover 404 are formed of a conductive material and the face plate 450 is mounted within the slots 428, 429 a seal is formed at the second end 405 of the module 400. Therefore leakage of EMI is greatly reduced in the present invention. It is therefore apparent that a GBIC module having a DB-9 connector at the media connector end can be formed quickly and inexpensively by using the components as described herein. The module will also be FCC compliant due to the shielding as discussed above.

Figure 12:
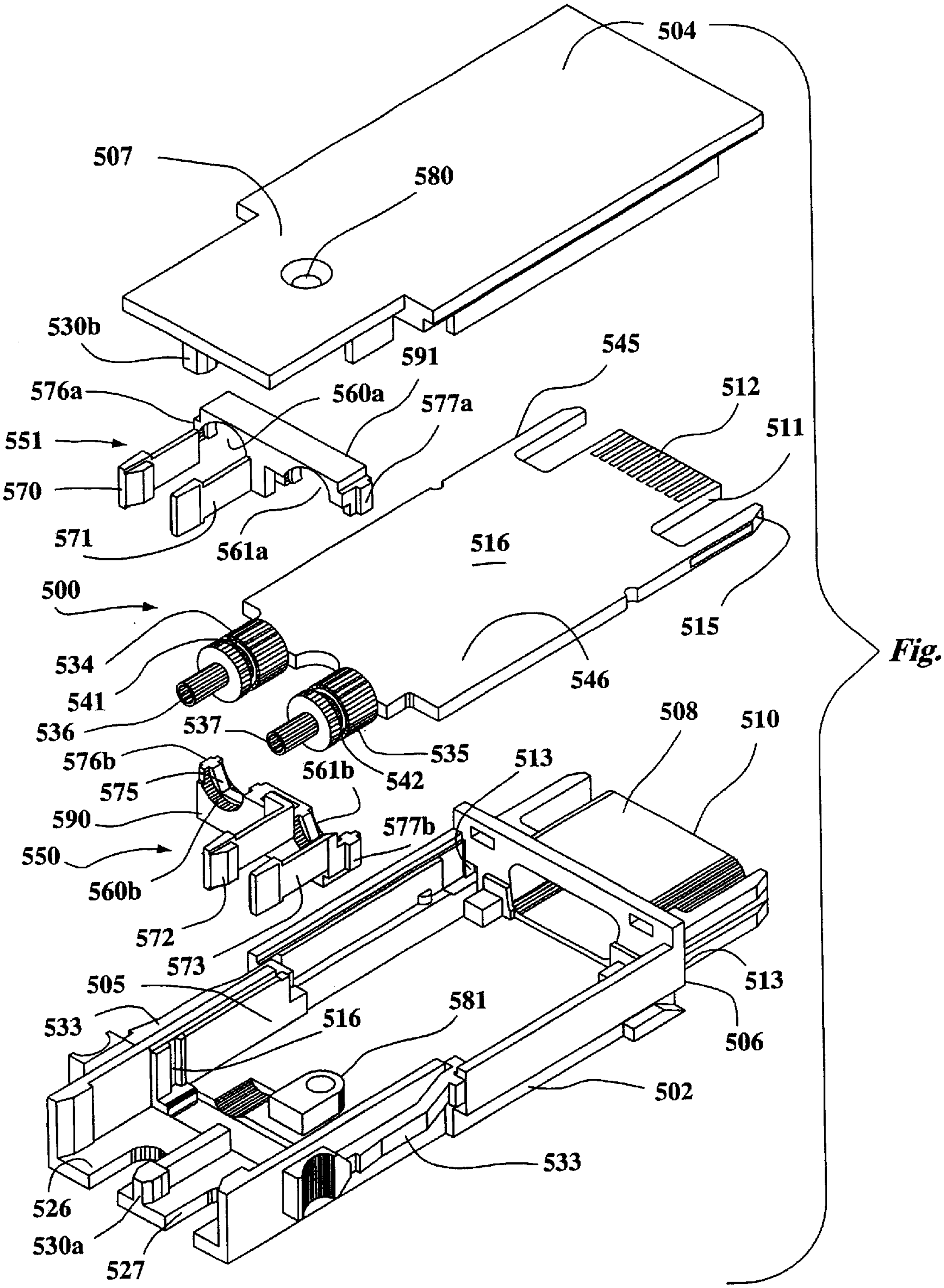
FIG. 12 is an isometric exploded view of another embodiment of the interface module.

FIG. 12 discloses an exploded isometric view of an interface converter module 500. Generally, the module 500 differs from the previous discussed embodiments in that it converts electrical signals to or from optoelectronic signals. The module 500 includes a cover 504, a printed circuit board 516 and a base 502. At the first end of the module 506 on the base is an integrally formed connector 510 for connecting with a host device. As previously discussed, this connector includes a D-shaped shroud 508 for receiving the contact beam 511 of the printed circuit board 516. The contact beam 511 includes contact traces 512 that are inserted within the shroud 508 in order to form a pluggable male ribbon style connector 510. As discussed above, the base 502, in a preferred embodiment, is formed of a die-cast metal and the connector 510 is also formed of one-piece with the base 502 of the die-cast metal. As discussed above, the printed circuit board also includes guide tabs 515 which are inserted into apertures 513 of the base 502. A contact beam 511 is located at the first end 545 of the printed circuit board.

At the second end 546 of the printed circuit board is located a first optical subassembly 534 and a second optical subassembly 535. In a preferred embodiment, the first optical subassembly 534 is a transmitting optical subassembly (TOSA) including a VCSEL. However, any type of optical transmitting device may be used including an LED or other surface emitting laser. In a preferred embodiment, the second optical subassembly 535 is a receiving optical subassembly (ROSA) and includes a photo diode. However, any type of optical receiving material may be used. The optical subassemblies 534, 535 are mounted at the second end 546 of the printed circuit board 516 and are electrically connected to the circuitry and components on the printed circuit board 516 and provide for the conversion of signals as discussed above for the Giga-Bit Converter specification. Protruding from the optical subassembly 534, 535, are ferrule receiving barrels 536, 537, respectively.

The second end 546 of the printed circuit board 516 is mounted within the second end 505 of the base 502. The second end 505 of the base 502 includes a receptacle opening 526 that forms an SC duplex receptacle. The standardized SC duplex opening 526 includes a pair of rectangular shaped openings, polarizing slots 527 and a center wall 530*a* to separate the pair of receptacle openings. The cover 504 at the second end 507 includes center wall 530*b* which mounts on top of wall 530*a* of the base 502 in order to completely separate the pair of optical receptacles.

A first optical subassembly mounting half 550 is provided for orienting and securing the optical subassemblies 534, 535 within the module 500. The first optical subassembly mounting half 550 mates with a second optical subassembly mounting half 551 in order to capture therein the pair of optical subassemblies 534, 535. Each mounting half 550, 551 includes a main body or member 590, 591. Each mounting half 550, 551 includes a throughport half 560*a,* 560*b,* 561*a,* and 561*b* attached to its respective member. In a preferred embodiment the throughport 560*a* of the second mounting half 551 includes a pair of latch arms 570, 571 protruding therefrom. The throughports are also known as transmitter and receiver mounting provisions. Alternatively, the first mounting half 550 includes a pair of latch arms, 572, 573 protruding adjacent the throughport 561*b*. Each mounting half throughport 560*a,* 560*b* and 561*a,* 561*b* include hexagonal shaped locating walls 575. The locating walls 575 mate with the groove 541, 542 of the optical subassembly 534, 535. Therefore upon assembly of the mounting half 550, 551 the hexagonal shaped walls 575, which includes three linear segments or segmented ridges, will align with the grooves 541, 542 of the optical subassembly 534, 535 in order to position the optical subassemblies within the mounting halves 550, 551. The mounting halves 550, 551 are substantially identical so as to be hermaphroditic. Mounted together, the two mounting halves 550, 551 form a mounting block. The mounting halves mate together in order that the latch arms 570, 571 are centered adjacent the throughport 560*a,* 560*b* and also are laterally positioned adjacent the latch arms 572, 573 which are axially centered to the throughports 561*a,* 561*b*. The mounting halves 550, 551 can be formed of an insulating material such as a polymer material, for example, LCP that will insulate the optical subassemblies from the conductive base 502 and cover 504. However, portions of the mounting halves 550, 551 can be metallized. In an embodiment the optical subassemblies 534, 535 may be formed of conductive material or portions thereof may be conductive and the electrical isolation of the optical subassemblies from the conductive housing of the module is necessary in order to reduce electromagnetic interference and/or electromagnetic radiation. The hermaphroditic feature of the mounting half allows for the use of a single mold instead of two molds for forming the completed mounting block.

The mounting halves 550, 551 also include side protrusions 576*a,* 576*b* and 577*a* and 577*b*. When the mounting halves 550, 551 are joined together a side protrusion 577*a,* 577*b* is formed that runs along the majority of the height of the complete mounting member at a side adjacent the throughport 561*a,* 561*b* and a side protrusion 576*a,* 576*b* that runs along the majority of the height of the mounting member adjacent throughport 560*a,* 560*b*. The side protrusion 576*a,* 576*b* is received in slot 516 of the base 502 when the printed circuit board 516 and the mounting members 550, 551 are mounted within the base 502.

In a preferred embodiment the module 500 is assembled according to the following steps. The first optical assembly mounting half 550 is mounted within the second end 505 of the base 502 having side protrusion 576*b* aligned within slot 516 and side wall 577*b* aligned in a slot on the wall opposite slot 516. The printed circuit board 516 is oriented above the base 502 and the first end 545 of the printed circuit board is mounted within the base by inserting guide tabs 515 within apertures 513 and simultaneously sliding contact beam 511 within the D-shaped shell 508. The second end 546 of the printed circuit board is then lowered into the base 502 so that the optical subassemblies, 534, 535 are mounted onto the first mounting half 550 so that the hexagonal walls 575 align with grooves 541, 542. The second optical subassembly mounting half 551 is then mounted within the base 502 and aligned with the first mounting half 550 in order to capture the optical subassemblies 534, 535 within the throughports 560*a,* 561*b* and 561*a,* 561*b* by aligning the hexagonal walls of the second mounting half 551 to the grooves 541, 542 of the optical subassemblies 534, 535. Release lever arms 533 are then mounted onto the base in a manner as previously discussed. The cover 540 is then placed onto the base 502 and a securing member is inserted in the aperture 580, through the printed circuit board and into aperture 581 in the base 502. By tightening the securement member the cover is secured to the base 502 and simultaneously secures the mounting halves 550, 551 within the housing to secure the optical subassemblies within the module and also secure the release lever arms 533 to the module. Therefore, it can be understood that the interface converter module 500 is assembled quickly and inexpensively with very few components. It may be understood that the securement of the mounting halves 550, 551 within the module housing via the side walls 576*a,* 576*b* and 577*a,* 577*b* within slots 516 of the base 502 provide for the optical subassemblies 534, 535 to be centered axially within the openings 526 of the SC duplex receptacle formed at the second end 505 of the module 500. The hexagonal walls 575 of the mounting halves 550, 551 act to center the optical subassemblies in the throughports 560*a,* 560*b,* and 561*a,* 561*b* both in the x, y and z planes. Therefore, an interface converter is provided for converting optical signals to or from electrical signals by the insertion of an SC plug into the receptacle opening 526 of the module and such signals will be transferred through the circuitry of the printed circuit board 516 through the contact fingers 512 and to or from a host device to which the connector 510 of the module 500 is mounted.

Furthermore, it should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A device comprising:

a base made of a metallic material;

a cover made of a metallic material; and a mounting block retained between the base and the cover, the mounting block includes a first mounting half and a second mounting half, the first mounting half and the second mounting half being substantially hermaphroditic such that the first mounting half and the second mounting half can be assembled in opposite transverse relation to form the mounting block, the first mounting half and the second mounting half made of a polymer material, and wherein the first mounting half includes:

a member having a transmitter mounting provision for receiving a transmitter sub-assembly and a receiver mounting provision for receiving a receiver sub-assembly, wherein the transmitter mounting provision is configured to overlap one half of a perimeter of the transmitter sub-assembly, and wherein the receiver mounting provision is configured to overlap one half of a perimeter of the receiver sub-assembly, a first latch arm connected to the member, and a second latch arm connected to the member, wherein the transmitter mounting provision and the receiver mounting provision straddle the second latch arm, and wherein the first latch arm and the second latch arm straddle one of the transmitter mounting provision and the receiver mounting provision so as to engage complementary features of a mating connector.

2. The device according to claim 1 wherein the transmitter mounting provision includes a first set of three linear segments configured to engage a reduced diameter portion of the transmitter sub-assembly, and wherein the first set of three linear segments form one half of a first hexagonal opening, and wherein a first linear segment of the first set of three linear segments of the transmitter mounting provision contacts the transmitter sub-assembly at a first point, and wherein a second linear segment of the first set of three linear segments of the transmitter mounting provision contacts the transmitter sub-assembly at a second point, and wherein a third linear segment of the first set of three linear segments of the transmitter mounting provision contacts the transmitter sub-assembly at a third point so as to align the transmitter sub-assembly within the mounting half of the mounting block, and wherein the receiver mounting provision includes a second set of three linear segments configured to engage a reduced diameter portion of the receiver sub-assembly, and wherein the second set of three linear segments form one half of a second hexagonal opening, and wherein a first linear segment of the second set of three linear segments of the receiver mounting provision contacts the receiver sub-assembly at a first point, and wherein a second linear segment of the second set of three linear segments of the receiver mounting provision contacts the receiver sub-assembly at a second point, and wherein a third linear segment of the second set of three linear segments of the receiver mounting provision contacts the receiver sub-assembly at a third point so as to align the receiver sub-assembly within the mounting half of the mounting block.

3. The device according to claim 2 wherein the first latch arm is positioned near an end of the member.

4. The device according to claim 3 wherein the first latch arm is flexible.

5. The device according to claim 4 wherein the second latch arm is flexible.

6. The device according to claim 5 wherein the first mounting half of the mounting block is metallized.

* * * * *